US012410493B2

(12) United States Patent
Rohde et al.

(10) Patent No.: US 12,410,493 B2
(45) Date of Patent: Sep. 9, 2025

(54) PROCESS FOR THE RECOVERY OF LITHIUM FROM WASTE LITHIUM ION BATTERIES

(71) Applicant: BASF SE, Ludwigshafen am Rhein (DE)

(72) Inventors: Wolfgang Rohde, Ludwigshafen (DE); Birgit Gerke, Ludwigshafen (DE); Kerstin Schierle-Arndt, Ludwigshafen (DE); Torben Adermann, Ludwigshafen (DE); Matthias Voges, Ludwigshafen (DE); Regina Vogelsang, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 876 days.

(21) Appl. No.: 17/597,482

(22) PCT Filed: Jul. 24, 2020

(86) PCT No.: PCT/EP2020/070986
§ 371 (c)(1),
(2) Date: Jan. 7, 2022

(87) PCT Pub. No.: WO2021/018778
PCT Pub. Date: Feb. 4, 2021

(65) Prior Publication Data
US 2022/0274841 A1  Sep. 1, 2022

(30) Foreign Application Priority Data

Jul. 26, 2019 (EP) .................................... 19188696
Jan. 14, 2020 (EP) .................................... 20151674

(51) Int. Cl.
*C22B 3/12* (2006.01)
*C01D 15/08* (2006.01)
(Continued)

(52) U.S. Cl.
CPC ................ *C22B 3/12* (2013.01); *C01D 15/08* (2013.01); *C22B 7/008* (2013.01); *C22B 26/12* (2013.01);
(Continued)

(58) Field of Classification Search
None
See application file for complete search history.

(56) References Cited

U.S. PATENT DOCUMENTS 4,036,713 A      7/1977  Brown
9,799,880 B2 *  10/2017  Schroedle .............. C01G 53/82
(Continued)

FOREIGN PATENT DOCUMENTS

CN       107017443 A    8/2017
JP     2012 229481 A   11/2012
(Continued)

OTHER PUBLICATIONS

Meshram et al., "Extraction of lithium from primary and secondary sources by pre-treatment, leaching and separation . . . ," Hydrometallurgy, vol. 150, pp. 192-208, Dec. 1, 2014.
International Search Report dated Sep. 8, 2020, PCT/EP2020/070986.

*Primary Examiner* — John J Figueroa
(74) *Attorney, Agent, or Firm* — Armstrong Teasdale LLP

(57) ABSTRACT

A process for the recovery of lithium from waste lithium ion batteries or parts thereof is disclosed. The process comprising the steps of (a) providing a particulate material containing a transition metal compound and/or transition metal, wherein the transition metal is selected from the group consisting of Mn, Ni and Co, and wherein further at least a fraction of said Ni and/or Co, if present, are in an oxidation state lower than +2, and at least a fraction of said Mn, if present, is manganese(II)oxide; which particulate material further contains a lithium salt and a fluoride salt, and which
(Continued)

particulate material optionally contains calcium provided that the element ratio calcium to fluorine is 1.7 or less or is zero; (b) treating the material provided in step (a) with a polar solvent and an alkaline earth hydroxide; and (c) separating the solids from the liquid, optionally followed by washing the solid residue with a polar solvent such as water provides good separation of lithium in high purity, and recovery of valuable transition metals.

15 Claims, 5 Drawing Sheets

(51) Int. Cl.
  *C22B 7/00* (2006.01)
  *C22B 26/12* (2006.01)
  *H01M 10/54* (2006.01)

(52) U.S. Cl.
  CPC ......... *H01M 10/54* (2013.01); *C01P 2002/72* (2013.01); *C01P 2006/80* (2013.01)

(56) References Cited

U.S. PATENT DOCUMENTS

| | | | |
|---|---|---|---|
| 2011/0070497 A1* | 3/2011 | Deguchi | H01M 4/366 429/231.1 |
| 2012/0141878 A1* | 6/2012 | Ohashi | H01M 10/4235 429/300 |
| 2013/0171523 A1* | 7/2013 | Chen | H01M 4/525 429/231.95 |
| 2014/0038062 A1* | 2/2014 | Kawakami | H01M 10/0568 423/467 |
| 2016/0064729 A1* | 3/2016 | Shindo | C01G 53/52 429/231.95 |
| 2020/0176807 A1* | 6/2020 | Nishio | H01M 10/052 |
| 2021/0280917 A1* | 9/2021 | Jin | H01M 10/0562 |
| 2023/0406717 A1* | 12/2023 | Born | C22B 3/24 |

FOREIGN PATENT DOCUMENTS

JP        2015203131 A    11/2015
WO    WO 2017/091562 A1    6/2017

* cited by examiner

PROCESS FOR THE RECOVERY OF LITHIUM FROM WASTE LITHIUM ION BATTERIES

This application is a national stage filing under 35 U.S.C. § 371 of International Application No. PCT/EP2020/070986, filed on Jul. 24, 2020, which claims the benefit of priority to EP Application Serial No. 19188696.9, filed on Jul. 26, 2019, and to European Application No. 20151674.7, filed on Jan. 14, 2020; the disclosure of each of these applications are each incorporated herein by reference in their entirety.

The present invention is directed towards a process for the recovery of lithium from spent lithium ion batteries containing at least one of the transition metals nickel, manganese and cobalt; the process pertains specifically to the separation of lithium from undesired impurities, by extracting lithium as lithium hydroxide from a particulate material obtained from the lithium ion batteries, particularly the cell material thereof, typically after discharging, shredding and reducing at elevated temperature.

Storing electrical energy is a subject of growing interest. Efficient storage of electric energy allows for the generation of electrical energy when it is advantageous and when and where needed. Secondary lithium batteries are of special interest for energy storage since they provide high energy density due to the small atomic weight and the large ionization energy of lithium, and they have become widely used as a power source for many portable electronics such as cellular phones, laptop computers, mini-cameras, etc. but also for electric vehicles. Especially the growing demand for raw materials such as lithium, cobalt and nickel will cause challenges in future time.

Lifetime of lithium ion batteries is not unlimited. It is to be expected, therefore, that a growing number of spent lithium ion batteries will emerge. Since they contain important transition metals such as, but not limited to cobalt and nickel, and, in addition, lithium, spent lithium ion batteries may form a valuable source of raw materials for a new generation of lithium ion batteries. For that reason, increased research work has been performed with the goal of recycling transition metals and lithium from used lithium ion batteries, or from batteries or parts thereof that do not meet the specifications and requirements; such off-spec materials and production waste may as well be a source of raw materials.

Two main processes have been subject to raw material recovery. One main process is based upon smelting of the corresponding battery scrap. By this, a metal alloy containing Ni and Co is obtained while the lithium is lost in the slag from which it is very difficult to recover. This metallic alloy can be hydrometallurgically processed to extract the metals, e.g. the transition metals.

The other main process is the direct hydrometallurgical processing of battery scrap materials. Principles have been disclosed in WO 2017/091562 and in J. Power Sources, 2014, 262, 255 ff. Such hydrometallurgical processes will furnish transition metals as aqueous solutions, for example as sulfate solution, or in precipitated form, for example as hydroxides, separately or already in the desired stoichiometries for making a new cathode active material. In the latter case the composition of metal salt solutions may be adjusted to the desired stoichiometries by addition of single metal components.

In WO 2017/091562, a co-precipitation of transition metals is described. In WO 2014/180743, a process of co-precipitation is described wherein ammonia or amines are used.

Typically, batteries are first dismantled to modules or even cells. In the case of direct hydrometallurgical processing the battery scrap is mechanically processed to separate bigger parts from casing and wiring. The electrode active materials i.e. the graphite from the anode and the lithium transition metal oxides from the cathode together with some impurities form a fine powder the so called black mass or black powder which constitute the feed of subsequent hydrometallurgical process steps. In some processes the battery scraps are subjected to a heat treatment or pyrolysis step which is performed at temperatures well below the melting point of the transition metals contained in the scrap in this respect this treatment differs from a smelting process that is operated above the melting point of the transition metals contained in the scrap.

Such heat-treated black masses may be obtained from treating batteries in waste incineration ovens. The waste batteries or battery modules or battery cells are fed to the incineration oven where the battery feed is partially burned. The product of this treatment is cooled and mechanically treated using any kind of shredding or milling device suitable to separate a metallic fraction from the powdery black mass. These black masses are materials of low reactivity under normal conditions and can thus be transported easily.

Several authors describe a heat treatment of waste lithium ion batteries or components containing the electrode active materials of these kind of batteries at elevated temperatures above 400° C. Such a heat treatment results in a complete evaporation of the electrolyte solvents contained in the battery and in a decomposition of polymeric components. The materials obtained from such a heat treatment may be subjected to different mechanical treatments and separation operations to separate out different metal fractions and a powdery substance comprising mainly the electrode active materials from the anode, i.e. graphite and from the cathode, i.e. a lithium containing transition metal material. These powders are often called "black masses" or "black powders" or "active mass". Depending on the reaction conditions the latter material is often at least partially reduced thus, containing metallic Ni and Co phases manganese oxide phases and lithium salts like LiOH, $Li_2CO_3$, LiF, $LiAlO_2$, $Li_3PO_4$. The reduction takes place by reductive conditions during the heat treatment either by introducing reducing gases like hydrogen or carbon monoxide or at temperatures above 500° C. by the carbonaceous material contained in the waste battery material namely graphite and soot. J. Li et al., J. Hazard. Mat. 2016, 302, 97 ff, disclose an oxygen-free roasting/wet magnetic separation process for recycling cobalt, lithium carbonate and graphite from spent $LiCoO_2$/graphite batteries.

In JP2012229481, waste batteries are treated in several steps in a way to bind the fluorine contained in the batteries in the conducting electrolyte salt, usually $LiPF_6$, and the binder polymer, usually polyvinylidene fluoride (PVDF). This is achieved by first treating the waste batteries with aqueous calcium hydroxide (slaked lime) solution to hydrolyze the conducting salt and precipitate fluoride as calcium fluoride. Starting from conversion experiments with model substances like $LiCoO_2$, JP 2012-229481 discloses a process for the recovery of metals from spent lithium ion batteries comprising a preliminary immersion step followed by high temperature oxidation, reductive roasting, aqueous treatment with filtration, and recovery of lithium carbonate from the filtrate and of transition metals from the residue.

Known methods for recovering valuable materials typically face the problem that spent batteries, and namely the cells therein containing most of these materials, contain a high level of impurities, like compounds of fluorine and/or phosphorous, which must be removed to recover the desired materials in a purity that allows use in the production of new cells (battery grade materials). It is therefore an objective of the present invention to provide a process that allows the easy recovery of valuable metals contained in battery scraps, namely lithium, nickel and if present cobalt and manganese. It is another objective of the present invention to provide a method for the recovery of further elements such as carbon as graphite, and fluoride. It is a further objective of the present invention to provide an economic process reducing the number of expensive and/or energy consuming steps. It is a further objective of the present invention to provide a process for the recovery of said transition metals or their compounds in high purity especially with low contents of copper and noble metals like Ag, Au and platinum group metals, and high purity lithium, or a compound thereof, with low contents of fluorine and/or phosphorous or other metal impurities. Typically, the recovered metals or metal compounds are transformed to the corresponding transition metal salts, often sulfates and lithium carbonate and often lithium hydroxide.

Known methods for binding fluoride typically are complex and require several process steps. Thus, it is an objective of the present invention to solve the problems mentioned above related to the recovery of Ni, Co and lithium hydroxide from at least partially reduced black masses containing Ni and/or Co where at least 10% of the Ni and/or Co are present in an oxidation state lower than +2 and which contains in addition also lithium salts and fluoride salts in which the molar ratio of calcium to fluorine is limited to 1.7 or less or zero. Such a black mass is often ferromagnetic.

Accordingly, the process as defined at the outset has been found, hereinafter also referred to as inventive process or as inventive recycling process. The inventive process comprises steps defined in more detail below, hereinafter also referred to as step (a), step (b), step (c) etc.

The invention thus primarily pertains to a process for the recovery of lithium as Li-salts from a material comprising waste lithium ion batteries or parts thereof, which process comprises the steps of
   (a) providing a particulate material containing a transition metal compound and/or transition metal, wherein the transition metal is selected from the group consisting of Mn, Ni and Co, and wherein further at least a fraction of said Ni and/or Co, if present, are in an oxidation state lower than +2, and at least a fraction of said Mn, if present, is manganese(II)oxide; which particulate material further contains a lithium salt and a fluoride salt, and which particulate material optionally contains calcium provided that the element ratio calcium to fluorine (i.e. molar ratio: mol Ca:mol F) is 1.7 or less or is zero;
   (b) treating the material provided in step (a) with a polar solvent and an alkaline earth hydroxide; and
   (c) separating the solids from the liquid, optionally followed by washing the solid residue with a polar solvent such as water.

The polar solvent used in the present process typically is selected from water, alcohols, ketones, esters, organic carbonates, polyethers, nitriles, and mixtures thereof capable to dissolve calcium hydroxide as good as water or even better. Examples of such solvents are polyols like glycol, glycerol or polyethylene glycols, and mixtures thereof.

Protic solvents, as specifically mentioned below, are water, alcohols, and mixtures thereof. An aqueous medium such as an aqueous solvent or aqueous liquid contains primarily (i.e. by 50% b.w. or more, especially 80% b.w. or more, more especially 90% b.w. or more) water, it includes water and mixtures of water with one or more alcohols; it may contain further dissolved substances as long as the major water content is maintained within one or more of the ranges given above.

Step (b) primarily provides a suspension of the particulate material in the polar solvent; it is preferably carried out with heating; the treatment with the alkaline earth hydroxide is typically done at temperatures from the range 60 to 200° C., preferably 70 to 150° C. Where the boiling point of the polar solvent is exceeded, the treatment is carried out under pressure to hold the solvent, or at least a fraction thereof, in the liquid state. Of special technical importance is the temperature range around the boiling point of water, i.e. about 70 to 150° C., where the treatment can be achieved using an aqueous liquid or water at normal pressure or slightly elevated pressure (e.g. up to 5 bar). Alternatively, present step (b) can be carried out with application of higher temperatures and pressures, e.g. 150 to 300° C. and 1.5 to 100 bar.

The treatment is typically carried out by combining an amount of alkaline earth hydroxide (AEH) with the particulate material (PM), which corresponds to at least 5%, and typically not more than 100%, of its weight, e.g 50-1000 g of AEH on 1 kg of PM, preferably 100-1000 g AEH, more preferably 200-1000 g AEH on 1 kg of PM. The amount of polar solvent is typically chosen to ensure miscibility of the components, e.g. using on one part by weight of combined solids (PM and AEH) 0.5 to 95, preferably about 2.5 to 21 parts by weight of the polar solvent; or in certain cases 1 to 20, such as about 2 to 10, parts by weight of the polar solvent.

In one embodiment of the present invention, step (b) is carried out in a vessel that is protected against strong bases, for example molybdenum and copper rich steel alloys, nickel-based alloys, duplex stainless steel or glass-lined or enamel or titanium coated steel. Further examples are polymer liners and polymer vessels from base-resistant polymers, for example poly-ethylene such as HDPE and UHMPE, fluorinated polyethylene, perfluoroalkoxy alkanes ("PFA"), polytetrafluoroethylene ("PTFE"), PVdF and FEP. FEP stands for fluorinated ethylene propylene polymer, a copolymer from tetrafluoroethylene and hexafluoropropylene.

The treatment is typically done using a mixing device, e.g. a stirrer, with power application typically up to 10 W per kg of suspension, e.g. 0.5 to 10 W/kg, and/or cycled by pumping in order to achieve a good mixing and to avoid settling of insoluble components. Shearing can be further improved by employing baffles. Furthermore, the slurry obtained in step (b) may advantageously be subjected to a grinding treatment, for example in a ball mill or stirred ball mill; such grinding treatment may lead to a better access of the polar solvent to a particulate lithium containing transition metal oxide material. Shearing and milling devices applied typically are sufficiently corrosion resistant; they may be produced from similar materials and coatings as described above for the vessel.

In one embodiment of the present invention, step (b) has a duration in the range of from 20 minutes to 24 hours, preferably 1 to 10 hours.

In one embodiment step (b) is performed at least twice to reach an optimum recovery of lithium hydroxide or the lithium salt. Between each treatment a solid-liquid separation is performed. The obtained lithium salt solutions may be combined or treated separately to recover the solid lithium salts.

In on embodiment of the present invention, step (b) and (c) are performed in batch mode.

In on embodiment of the present invention, step (b) and (c) are performed in continuous mode, e,g. in a cascade of stirred vessels (step b) and/or in a cascade of stirred vessel plus centrifuge (step c).

In one embodiment of the present invention, the polar solvent in present step (b) is an aqueous medium, and the ratio of the aqueous medium to material provided in step (a) is in the range of from 1:1 to 99:1, preferably 5:1 to 20:1 by weight.

The alkaline earth hydroxide is generally selected from hydroxides of Mg, Ca, Sr and Ba; preferred are calcium hydroxide, barium hydroxide and mixtures thereof; most preferred is calcium hydroxide. The alkaline earth hydroxide used in present step (b) may be used as such, or may be added in form of the oxide, or mixture of oxide and hydroxide, to form the alkaline earth hydroxide upon contact with a polar solvent selected from protic solvents noted above.

The particulate material provided in step (a) generally comprises material obtained from waste lithium ion batteries after carrying out the preliminary step (i) of heating under inert or reducing conditions to a temperature from the range 80 to 900° C., e.g. 200 to 850° C., especially 200 to 800° C. Preliminary step (i) is typically carried out directly after discharging the lithium ion batteries, dismantling and/or shredding as explained in more detail below. In some applications shredding and/or dismantling is carried out after preliminary step (i). The lithium ion batteries used, and thus the particulate material provided in step (a), typically contains carbon, e.g. in the form of graphite.

Where elevated temperatures are noted, e.g. for treating the material in present step (i), exposure times, where indicated, define the total dwell time in the reactor or furnace, which has been heated to said elevated temperature; the temperature of the material should reach a temperature from the range given for at least a fraction of said dwell time.

Unless specified otherwise, "contain" in relation to any substance generally means presence of such substance in an amount typically still detectable by x-ray powder diffraction, e.g. 1% by weight or more, or means presence of such constituents in an amount typically detectable by ICP after a suitable digestion, e.g. 10 ppm by weight or more. The particulate material (PM) provided in present step (a) typically contains, with respect to the elements, about 1 to 10% of lithium, about 3 to 30% of the combined transition metal elements cobalt and/or nickel, and about 4 to 40% of transition metal elements in total including any cobalt, nickel, manganese, copper and iron (all percentages by weight of dry particulate material provided in step (a)).

PM preferably contains nickel and optional further transition metals such as Co.

In the following, the particulate material provided in step (a), as well as the material subjected to step (i), will alternatively be summarized as lithium containing transition metal oxide material.

The carbon content may be used in the reducing pretreatment described above as a reducing agent. Other reducing agents useful to provide a reducing gas stream for this preliminary step (i) are as described in JP2012229481; preferred is hydrogen and/or carbon monoxide. The invention thus includes a process comprising steps (i) and (a), (b) and (c) as described above, wherein the heating step (i) is conducted under reducing conditions comprising the presence of carbon and/or a reducing gas selected from hydrogen, methane and carbon monoxide.

Step (i) Method 1:

Where hydrogen is used as the reducing gas, preliminary step (i) is preferably carried out as follows: (i) heating a lithium containing transition metal oxide material, which material stems from lithium ion batteries and contains fluorine compounds and/or compounds of phosphorous as impurities, to a temperature in the range of from 200 to 900° C., or as indicated above, in the presence of $H_2$.

Typically, the lithium containing transition metal oxide material heated in step (i) stems from lithium ion batteries and contains fluorine preferably in the range from 1% to 8% by weight, and/or phosphorous in the range from 0.2% to 2% by weight, relative to the weight of the lithium containing transition metal oxide material.

Step (i) carried out with hydrogen includes heating the lithium containing transition metal oxide material to a temperature in the range of from 200 to 900° C., preferably 300 to 600° C., more preferably 350 to 500° C. Since strong heating, especially under oxidative conditions, but to a lesser extent also under reductive atmosphere, tends to increase formation of insoluble species (such as $LiMnO_2$), it is preferred to generally expose the lithium containing transition metal oxide material not to temperatures of 500° C. or more. Consequently, it is preferred to keep the temperature also in step (i) below 500° C.; in one embodiment of the present process, step (i) is carried out using hydrogen and a temperature from the range 350 to 450° C., e.g. 380 to 450° C., especially 380 to 440° C. The atmosphere used to do the reduction, according to this embodiment, contains 0.1% to 100% by volume of hydrogen, the rest being a non-oxidizing gas, preferably nitrogen, argon, steam, carbon monoxide, carbon dioxide or mixtures of at least two of these gases. Preferred non-oxidizing gases are nitrogen and steam and mixtures of nitrogen and steam. In a preferred embodiment, step (i) of present process is carried out mainly under hydrogen, for example under an atmosphere containing 35 to 100%, preferably 50 to 100%, by volume (normal conditions) of hydrogen, the rest, if present, being a non-oxidizing gas. In said embodiment of the present invention, step (i) has a duration (dwell time) in the range of from 10 minutes to 30 hours, preferably 20 min to 8 hours, more preferably 30 min to 4 hours. Of special technical interest is a duration of step (i) lasting 20 to 90 minutes, with presence of hydrogen as preferred.

The concentration of hydrogen in the reduction atmosphere and the reaction time are dependent on each other. Usually a low concentration of hydrogen requires longer reduction times and vice versa.

In a preferred process of the invention, step (i) is thus carried out by heating the lithium containing transition metal oxide material to a temperature in the range of from 350 to 450° C. in the presence of more than 35%, especially 50-100%, by volume of $H_2$, and for a time period of 20 to 90 minutes. Within present invention, a particularly preferred process conducts step (i) using a temperature between 400 and 450° C., e.g. between 400 and 420° C., for up to 2.5 hours and 35 or more volume-% of hydrogen to recover Li in step (b) in an especially efficient way; applying too high temperatures may result in lower yields, longer duration does not lead to a negative effect but tends to lower the space time yield, while $H_2$ concentrations ≥35 vol-% translate into short reaction times ≤2.5 h and are therefore favored; an optimum space time yield is achievable using more than 80 volume-% of hydrogen.

After the heat treatment the material is transferred from the oven to a cooling unit. Here the material is cooled down to temperatures preferably of 100° C. and below. The cooling can be done at ambient conditions e.g. by storing the hot material in a chamber or vessel or in a rotating tube which may be the final non-heated or cooled part of a rotary kiln where the heat treatment is performed such that the heat can be conducted to the environment. Preferably the hot material can be cooled and conveyed by cooled conveying screws. A faster cooling can be obtained by introducing gases which after having passed the hot material bed may be fed to a heat exchanger. Such cooling by gases can be designed as fixed, moving or fluidized bed. The gases used are preferably inert gases like nitrogen, argon or carbon dioxide. It is also possible to employ reducing gases used for the reduction preferably during the beginning of the cooling period when the material is still at a temperature close to oven temperature. Afterwards the gas composition may be changed to an inert gas at lower temperatures even oxygen containing gases like air or mixtures of air and inert gases may be employed.

Alternatively, to cooling under dry conditions in a gas atmosphere it is also possible to quench the hot material by a liquid. This can be done by spraying the cooling liquid to the hot material either in quantities that the liquid is evaporated and the material remains virtually dry (cooling by evaporation) or in bigger quantities that a slurry of the material is formed. Cooling by a liquid is especially preferred when the obtained cooled material or slurry can be employed directly in step (b) of this invention. Thus, the preferred quenching liquids are polar solvents that are sufficiently temperature stable most preferred is water. The liquid can be pumped to a heat exchanger and recycled back to the cooling vessel.

Step (i) Method 2:

Where a carbonic material such as carbon is used as the reducing agent, preliminary step (i) is preferably carried out as follows: (i) heating the lithium containing transition metal oxide material to a temperature in the range of from 200 to 900° C. in the presence of said carbonic material such as carbon; e.g. in the presence of graphite. In a preferred embodiment of the present invention the graphite contained in the black mass is used as reducing agent.

Typically, the lithium containing transition metal oxide material heated in step (i) stems from lithium ion batteries and may contain typical impurities such as fluorine, as explained below in more detail.

Step (i) carried out with carbonic material such as carbon as reducing agent includes heating the lithium containing transition metal oxide material to a temperature in the range of from 200 to 900° C., preferably 300 to 850° C., more preferably 500 to 850° C.

The atmosphere used to effect the reduction, according to this embodiment, contains either no oxygen, or up to 20% by volume of oxygen, the rest being a non-oxidizing gas, preferably nitrogen, argon, steam, carbon monoxide, carbon dioxide or mixtures of at least two of these gases. Preferred non-oxidizing gases are nitrogen and carbon monoxide and mixtures of nitrogen and carbon monoxide. In a preferred embodiment, step (i) of the present process is carried out under air or under diluted air, for example under an atmosphere containing 1 to 20%, preferably 1 to 10%, by volume (normal conditions) of oxygen, the rest, if present, being a non-oxidizing gas. In said embodiment of the present invention, step (i) has a duration in the range of from 10 minutes to 30 hours, preferably 20 min to 8 hours, more preferably 30 min to 4 hours. Of special technical interest is a duration of step (i) lasting 20 to 120 minutes, especially 30-120 minutes, with presence of carbon as preferred.

After the heat treatment the material is transferred from the oven to a cooling unit. Here the material is cooled down to temperatures preferably of 100° C. and below. The cooling can be done at ambient conditions e.g. by storing the hot material in a chamber or vessel or in a rotating tube which may be the final non-heated or cooled part of a rotary kiln where the heat treatment is performed such that the heat can be conducted to the environment. Preferably the hot material can be cooled and conveyed by cooled conveying screws. A faster cooling can be obtained by introducing gases which after having passed the hot material bed may be fed to a heat exchanger. Such cooling by gases can be designed as fixed, moving or fluidized bed. The gases used are preferably inert gases like nitrogen, argon or carbon dioxide. It is also possible to employ reducing gases used for the reduction preferably during the beginning of the cooling period when the material is still at a temperature close to oven temperature. Afterwards the gas composition may be changed to an inert gas at lower temperatures even oxygen containing gases like air or mixtures of air and inert gases may be employed.

Alternatively, to cooling under dry conditions in a gas atmosphere it is also possible to quench the hot material by a liquid. This can be done by spraying the cooling liquid to the hot material either in quantities that the liquid is evaporated and the material remains virtually dry (cooling by evaporation) or in bigger quantities that a slurry of the material is formed. Cooling by a liquid is especially preferred when the obtained cooled material or slurry can be employed directly in step (b) of this invention. Thus, the preferred quenching liquids are polar solvents that are sufficiently temperature stable most preferred is water. The liquid can be pumped to a heat exchanger and recycled back to the cooling vessel.

In one embodiment of the present invention the reduction conditions related to the hydrogen and/or carbon/oxygen concentration, and the temperature and duration of step (i) are chosen that at least a part of the lithium containing transition metal oxide material contains para-, anti-ferro-, ferro- and/or ferrimagnetic components. Preferred is the formation of ferro- or ferrimagnetic components resulting from the at least partial reduction of the lithium containing transition metal material. The extend of the reduction may vary in the range between 1 to 100% with respect to the nickel contained in the lithium containing transition metal material; preferred is a range from 80 to 100%.

The particulate material provided in present step (a) thus contains a transition metal compound and/or transition metal, wherein the transition metal is selected from the group consisting of Mn, Ni and/or Co, and wherein further at least a fraction of said Ni and/or Co, if present, are in an oxidation state lower than +2, and at least a fraction of said Mn, if present, is manganese(II)oxide; nickel and/or cobalt therein are typically at least in part present in their metallic state.

Presence of phases such as Ni and/or Co in oxidation state lower than +2, Mn in the form of manganese(II)oxide; and nickel and/or cobalt as metal, are detectable by XRD as described further below.

The lithium salt and the fluoride salt present in the particulate material provided in present step (a) are detected by standard methods as described below. The lithium salt and the fluoride salt contained in the particulate material provided in step (a) typically comprise one or more salts of LiOH, LiF, Li2O, Li2CO3, LiHCO3, lithium aluminates, lithium phosphate salts, mixed oxides of Li and one or more of Ni, Co, Mn, Fe, Al, Cu and/or fluorides of Ni, Co, Mn, Fe, Al, Cu. LiOH, LiF, Li2O, Li2CO3, LiHCO3, lithium aluminates and lithium phosphates typically make up 95% b.w. or more of all lithium salts present. Very often contained are LiF, Li2CO3, LiOH and lithium aluminate. A larger fraction of fluoride, e.g. 50% b.w. or more, is typically present as lithium fluoride. Since the fluoride salt present typically stems in part from the former battery electrolyte salt and the polymeric binder, which set free hydrogen fluoride during preliminary steps of discharging or dismantling or drying of the battery materials, other species of fluoride salts resulting from the rapid reaction of the hydrogen fluoride with former cell or electrode materials, such as cobalt fluoride, may be present as well.

The particulate material provided in present step (a) generally is a material that stems from lithium ion batteries or parts of lithium ion batteries, especially the cell materials thereof. It is provided for present step (a) in the form of a dry powder, wet powder or suspension of particles in a liquid. The material typically has an average particle diameter (D50 according to ISO 13320 EN:2009-10) from the range 1 µm to about 2 mm, especially 1 µm to 1 mm. In a typical process, the upper limit of the size of particles in the powdery material is given by a sieving step performed before present step (a) or even before step (i), e.g. using a sieve whose mesh allows passing of particles of 2 mm at maximum, especially of 1 mm at maximum.

Typically, said lithium containing transition metal oxide material is obtained after mechanic removal of casing, wiring or circuitry, thus typically consisting mainly of the cell material. For safety reasons, such lithium ion batteries are discharged completely, e.g. by immersion in a dry conductive bath such as metal shreds, or at least 80% discharged electrically (preferably more than 90%, most preferably more than 95%) by which the residual electrical energy may be recovered, otherwise, shortcuts may occur that constitute fire and explosion hazards. Such lithium ion batteries may be disassembled, punched, milled, for example in a hammer mill, or shredded, for example in an industrial shredder. Although not preferred, it is also possible to discharge the batteries by immersion into a conducting liquid e.g. an aqueous solution of a metal salt like sodium sulfate or the like. It is also possible to perform the shredding in a liquid preferably water. This has the advantage of preventing dust formation and the occurrence of ignitable atmospheres.

It may be advantageous to at least partially remove electrolytes before subjecting the material to the preliminary step (i), especially electrolytes that comprise an organic solvent or a mixture of organic solvents, for example by drying, for example at temperatures in the range of from 50 to 250° C. under atmospheric pressure or below. As noted above, the lithium containing transition metal oxide material is preferably not exposed to higher temperatures (especially not to 400° C. or more) under oxidizing conditions before subjecting it to present step (a).

In one embodiment of the present invention, said lithium containing transition metal oxide material is from battery scraps. In a preferred embodiment of the present invention, said lithium containing transition metal oxide material is from mechanically treated battery scraps, for example from battery scraps treated in a hammer mill or in an industrial shredder. This mechanical treatment can be done under dry conditions or under wet conditions preferably in the presence of water.

In one embodiment of the present invention, prior to step (a) a step (a1) is performed, said step (a1) comprising the removal of e.g. carbon or organic polymers by a solid-solid separation method. Examples of such solid-solid separation methods are electro-sorting, sieving, magnetic separation, flotation, or other classification methods. The solid-solid separation can be performed dry or in the presence of a suitable dispersing medium, preferably water.

In one embodiment of the present invention the mechanically treated battery scrap is ground prior to step (a). Such grinding is preferably performed in ball mills or stirred ball mills. The milling can be performed under wet or dry conditions, preferred are dry conditions.

In one embodiment of the present invention, the mechanically treated battery scrap is contacted with water and/or organic solvent followed by a solid-liquid separation step prior to step (a).

In one embodiment the mechanically treated battery scrap is contacted with a basic or acidic solution to facilitate the detachment of active material from the electrode foils, this is described in WO2018192122.

In one embodiment of the present invention, the mechanically treated battery scrap is subjected to a solvent treatment prior to the thermal treatment of step (i) in order to dissolve and separate polymeric binders used to bind the lithium transition metal oxides to the current collector films. Suitable solvents are N-methylpyrrolidone, N,N-dimethylformamide, N,N-dimethylacetamide, and N-ethylpyrrolidone, dimethylsulfoxide, hexamethyl phosphoramide, tetramethylurea, trimethylphosphate and triethylphosphate in their pure form or as mixtures.

The solvent treatments described above can be performed with one or more solvents in consecutive steps or in one step employing a solvent that is capable to dissolve electrolyte components and the binder polymers. The solvents are applied in a temperature range from 10° C. to 200° C. Especially the dissolution of polymers may require elevated temperatures in the range from 50 to 200° C. preferably between 100 and 150° C. The upper temperature is usually limited by the boiling point of the solvent unless pressures higher than 1 bar are applied.

In one embodiment the washing of mechanically treated battery scrap is performed with non-protic solvents in the absence of humidity, e.g., under dry gases like dry air, dry nitrogen.

In one embodiment of the present invention, said lithium containing transition metal oxide material does not only contain battery scrap material, but also parts or materials from parts of a lithium ion battery, such as off-spec material including pure electrode material. However, said lithium containing transition metal oxide material preferably contains in the range of from 0.1 to 80% by weight of compounds other than nickel compounds such as nickel/cobalt components or nickel/cobalt/manganese or nickel/cobalt/aluminum compounds, if applicable, and in extreme cases the valuable material is a minority component. Examples of such components are carbon in electrically conductive form, hereinafter also referred to as conductive carbon, for example graphite, soot, and graphene. Further examples of impurities are copper and its compounds, aluminum and compounds of aluminum, for example alumina, iron and iron compounds, zinc and zinc compounds, silicon and silicon compounds, for example silica and oxidized silicon $SiO_y$ with zero<y≤2, tin, silicon-tin alloys, and organic polymers such as polyethylene, polypropylene, and fluorinated polymers, for example polyvinylidene fluoride, tetrafluoroethylene polymers and the like. Further impurities are fluorine compounds, e.g inorganic fluorides, and compounds of phosphorous that may stem from liquid electrolytes, for example in the widely employed $LiPF_6$ and products stemming from the hydrolysis of $LiPF_6$. Battery scraps that serve as starting material for the inventive process may stem from multiple sources, and therefore said lithium containing transition metal oxide material in most of the embodiments contains compounds other than nickel/cobalt compounds or nickel/cobalt/manganese or nickel/cobalt/aluminum components, if applicable, one of such components being carbon in electrically conductive form in the range of from 2 to 65% by weight, referring to entire lithium containing transition metal oxide material.

In a typical embodiment of the present invention, said lithium containing transition metal oxide material contains one or more of the following further components or impurities:

i) in the range of from 20 ppm to 10%, especially 20 ppm to 3%, by weight of copper, as metal or in form of one or more of its compounds;

ii) in the range of from 100 ppm to 15% by weight of aluminum, as metal or in form of one or more of its compounds;

iii) in the range of from 100 ppm to 5% by weight of iron, as metal or alloy or in form of one or more of its compounds;

iv) in the range of from 20 ppm to 2% by weight of zinc, as metal or alloy or in form of one or more of its compounds;

v) in the range of from 20 ppm to 2% by weight of zirconium, as metal or alloy or in form of one or more of its compounds;

vi) in the range of from 1% to 8%, especially 2% to 8%, by weight of fluorine, calculated as a sum of organic fluorine, e.g., bound in polymers, and inorganic fluoride in one or more of its inorganic fluorides;

vii) in the range of from 0.2% to 2% by weight of phosphorus, which may occur in one or more inorganic compounds;

viii) in the range of from 100 ppm to 15% by weight of manganese, as metal or in form of one or more of its compounds.

Examples of such embodiments are lithium containing transition metal oxide material containing one or two of the above additional components, or additional components (i), (ii) and (iii); (i), (ii) and (iv); (i), (ii) and (v); (i), (ii) and (vi); (i), (ii) and (viii); (i), (iii) and (iv); (i), (iii) and (v); (i), (iii) and (vi); (i), (iii) and (vii); (i), (iii) and (viii); (i), (iv) and (v); (i), (iv) and (vi); (i), (iv) and (vii); (i), (iv) and (viii); (i), (v) and (vi); (i), (v) and (vii); (i), (v) and (viii); (i), (vi) and (vii); (i), (vi) and (viii); (i), (vii) and (viii); (i), (ii), (iii) and (iv); (i), (ii), (iii) and (v); (i), (ii), (iii) and (vi); (i), (ii), (iii) and (vii); (i), (ii), (iii) and (viii); (i), (ii), (iv) and (v); (i), (ii), (iv) and (vi); (i), (ii), (iv) and (vii); (i), (ii), (iv) and (viii); (i), (ii), (v) and (vi); (i), (ii), (v) and (vii); (i), (ii), (v) and (viii); (i), (ii), (vi) and (vii); (i), (ii), (vi) and (viii); (i), (ii), (vii) and (viii); (i), (iii), (iv) and (v); (i), (iii), (iv) and (vi); (i), (iii), (iv) and (vii); (i), (iii), (iv) and (viii); (i), (iii), (v) and (vi); (i), (iii), (v) and (vii); (i), (iii), (v) and (viii); (i), (iii), (vi) and (vii); (i), (iii), (vi) and (viii); (i), (iii), (vii) and (viii); (i), (iv), (v) and (vi); (i), (iv), (v) and (vii); (i), (iv), (v) and (viii); (i), (iv), (vi) and (vii); (i), (iv), (vi) and (viii); (i), (iv), (vii) and (viii); (i), (v), (vi) and (vii); (i), (v), (vi) and (viii); (i), (v), (vii) and (viii); (i), (vi), (vii) and (viii); (ii), (iii), (iv) and (v); (ii), (iii), (iv) and (vi); (ii), (iii), (iv) and (vii); (ii), (iii), (iv) and (viii); (ii), (iii), (v) and (vi); (ii), (iii), (v) and (vii); (ii), (iii), (v) and (viii); (ii), (iii), (vi) and (vii); (ii), (iii), (vi) and (viii); (ii), (iii), (vii) and (viii); (ii), (iv), (v) and (vi); (ii), (iv), (v) and (vii); (ii), (iv), (v) and (viii); (ii), (iv), (vi) and (vii); (ii), (iv), (vi) and (viii); (ii), (iv), (vii) and (viii); (ii), (v), (vi) and (vii); (ii), (v), (vi) and (viii); (ii), (v), (vii) and (viii); (ii), (vi), (vii) and (viii); (iii), (iv), (v) and (vi); (iii), (iv), (v) and (vii); (iii), (iv), (v) and (viii); (iii), (iv), (vi) and (vii); (iii), (iv), (vi) and (viii); (iii), (iv), (vii) and (viii); (iii), (v), (vi) and (vii); (iii), (v), (vi) and (viii); (iii), (v), (vii) and (viii); (iii), (vi), (vii) and (viii); (iv), (v), (vi) and (vii); (iv), (v), (vi) and (viii); (iv), (v), (vii) and (viii); (iv), (vi), (vii) and (viii); (v), (vi), (vii) and (viii); (i), (ii), (iii), (iv) and (v); (i), (ii), (iii), (iv) and (vi); (i), (ii), (iii), (iv) and (vii); (i), (ii), (iii), (iv) and (viii); (i), (ii), (iii), (v) and (vi); (i), (ii), (iii), (v) and (vii); (i), (ii), (iii), (v) and (viii); (i), (ii), (iii), (vi) and (vii); (i), (ii), (iii), (vi) and (viii); (i), (ii), (iii), (vii) and (viii); (i), (ii), (iv), (v) and (vi); (i), (ii), (iv), (v) and (vii); (i), (ii), (iv), (v) and (viii); (i), (ii), (iv), (vi) and (vii); (i), (ii), (iv), (vi) and (viii); (i), (ii), (iv), (vii) and (viii); (i), (ii), (v), (vi) and (vii); (i), (ii), (v), (vi) and (viii); (i), (ii), (v), (vii) and (viii); (i), (ii), (vi), (vii) and (viii); (i), (iii), (iv), (v) and (vi); (i), (iii), (iv), (v) and (vii); (i), (iii), (iv), (v) and (viii); (i), (iii), (iv), (vi) and (vii); (i), (iii), (iv), (vi) and (viii); (i), (iii), (iv), (vii) and (viii); (i), (iii), (v), (vi) and (vii); (i), (iii), (v), (vi) and (viii); (i), (iii), (v), (vii) and (viii); (i), (iii), (vi), (vii) and (viii); (i), (iv), (v), (vi) and (vii); (i), (iv), (v), (vi) and (viii); (i), (iv), (v), (vii) and (viii); (i), (iv), (vi), (vii) and (viii); (i), (v), (vi), (vii) and (viii); (ii), (iii), (iv), (v) and (vi); (ii), (iii), (iv), (v) and (vii); (ii), (iii), (iv), (v) and (viii); (ii), (iii), (iv), (vi) and (vii); (ii), (iii), (iv), (vi) and (viii); (ii), (iii), (iv), (vii) and (viii); (ii), (iii), (v), (vi) and (vii); (ii), (iii), (v), (vi) and (viii); (ii), (iii), (v), (vii) and (viii); (ii), (iii), (vi), (vii) and (viii); (ii), (iv), (v), (vi) and (vii); (ii), (iv), (v), (vi) and (viii); (ii), (iv), (v), (vii) and (viii); (ii), (iv), (vi), (vii) and (viii); (ii), (v), (vi), (vii) and (viii); (iii), (iv), (v), (vi) and (vii); (iii), (iv), (v), (vi) and (viii); (iii), (iv), (v), (vii) and (viii); (iii), (iv), (vi), (vii) and (viii); (iii), (v), (vi), (vii) and (viii); (iv), (v), (vi), (vii) and (viii); (i), (ii), (iii), (iv), (v) and (vi); (i), (ii), (iii), (iv), (v) and (vii); (i), (ii), (iii), (iv), (v) and (viii); (i), (ii), (iii), (iv), (vi) and (vii); (i), (ii), (iii), (iv), (vi) and (viii); (i), (ii), (iii), (iv), (vii) and (viii); (i), (ii), (iii), (v), (vi) and (vii); (i), (ii), (iii), (v), (vii) and (viii); (i), (ii), (iii), (vi) and (vii); (i), (ii), (iv), (v), (vi) and (vii); (i), (ii), (iv), (v), (vii) and (viii); (i), (ii), (iv), (vi), (vii) and (viii); (i), (ii), (v), (vi), (vii) and (viii); (i), (iii), (iv), (v), (vi) and (vii); (i), (iii), (iv), (v), (vii) and (viii); (i), (iii), (iv), (v), (vi) and (viii); (i), (iii), (iv), (vi), (vii) and (viii); (i), (iii), (v), (vi), (vii) and (viii); (i), (iv), (v), (vi), (vii) and (viii); (ii), (iii), (iv), (v), (vi) and (vii); (ii), (iii), (iv), (v), (vi) and (viii); (ii), (iii), (iv), (v), (vii) and (viii); (ii), (iii), (iv), (vi), (vii) and (viii); (ii), (iii), (v), (vi), (vii) and (viii); (ii), (iv), (v), (vi), (vii) and (viii); (iii), (iv), (v), (vi), (vii) and (viii). Another example is a lithium containing transition metal oxide material containing each of the above additional components.

Each of the percentages given above are by weight of the dry material (i.e. lithium containing transition metal oxide material as provided in present step (a)).

Said lithium containing transition metal oxide material typically contains nickel or cobalt or especially both nickel and cobalt. Examples of lithium containing transition metal oxide materials may be based on lithiated nickel cobalt manganese oxide ("NCM") or on lithiated nickel cobalt aluminum oxide ("NCA") or mixtures thereof.

Examples of layered nickel-cobalt-manganese oxides are compounds of the general formula $Li_{1+x}(Ni_aCo_bMn_cM^1{}_d)_{1-x}O_2$, with $M^1$ being selected from Mg, Ca, Ba, Al, Ti, Zr, Zn, Mo, V and Fe, the further variables being defined as follows:
zero≤x≤0.2
0.1≤a≤0.95,
Zero≤b≤0.9, preferably 0.05<b≤0.5,
zero≤c≤0.6,
zero≤d≤0.1, and a+b+c+d=1.

In a preferred embodiment, in compounds according to general formula (I)

$$Li_{(1+x)}[Ni_aCo_bMn_cM^1{}_d]_{(1-x)}O_2 \qquad (I)$$

$M^1$ is selected from Ca, Mg, Zr, Al, Ti and Ba,
and the further variables are defined as above.

Examples of lithiated nickel-cobalt aluminum oxides are compounds of the general formula $Li[Ni_hCo_iAl_j]O_{2+r}$. Typical values for r, h, i and j are:
h is in the range of from 0.8 to 0.95,
i is in the range of from 0.02 to 0.3,
j is in the range of from 0.01 to 0.10, and
r is in the range of from zero to 0.4.

Particularly preferred are $Li_{(1+x)}[Ni_{0.33}Co_{0.33}Mn_{0.33}]_{(1-x)}O_2$, $Li_{(1+x)}[Ni_{0.5}Co_{0.2}Mn_{0.3}]_{(1-x)}O_2$, $Li_{(1+x)}[Ni_{0.6}Co_{0.2}Mn_{0.2}]_{(1-x)}O_2$, $Li_{(1+x)}[Ni_{0.7}Co_{0.2}Mn_{0.1}]_{(1-x)}O_2$, $Li_{(1+x)}[Ni_{0.8}Co_{0.1}Mn_{0.1}]_{(1-x)}O_2$ each with x as defined above, and $Li[Ni_{0.85}Co_{0.13}Al_{0.02}]O_2$.

Said lithium containing transition metal oxide material may have a regular shape but usually it has an irregular shape. It is preferred, though, to remove a light fraction such as housing parts from organic plastics and aluminum foil or copper foil as far as possible, for example in a forced stream of gas.

In one embodiment the composition of the atmosphere is changed during step (i) this may be done for example in the case that volatile organic compounds are present in the feed that will be stripped off at an inert atmosphere before switching the atmosphere to a reducing one, e.g. hydrogen containing one.

In one embodiment an oxidizing atmosphere in a temperature range between 20 to 300° C. is employed in step (i) prior to the reduction with a hydrogen containing atmosphere. By this embodiment, some impurity components namely organic components may be burned off, or the material is dried (especially employing temperatures up to 250° C. as noted further above. Preferred oxidizing gases are oxygen or oxygen containing gases e.g. air. The material stemming from spent lithium ion battery cells, containing lithium, transition metal oxide and further a fluorine and/or phosphorous compound, is preferably not subjected to oxidization above 300° C. before carrying out the steps of the present process.

In one embodiment of the present invention, prior to step (a) a step (a1) is performed, said step (a1) comprising the removal of e.g. carbon or organic polymers by a dry solid-solid separation method. Examples of such dry solid-solid separation methods are electro-sorting, sieving, magnetic separation or other classification methods. Here step (a1) is introduced as an additional step.

In one embodiment of the present invention, the material provided in step (a) is ground prior to step (b) in order to de-agglomerate different solid particles from one another in cases that these are somehow agglomerated, for example by residual binder polymers. The grinding can be performed under dry or wet conditions. Preferably the grinding is done in an aqueous medium that is also employed in the consecutive step (b).

At the end of step (b), the pressure may be released if applicable. A solution of a lithium salt is obtained as the liquid from step (c), typically an aqueous solution containing LiOH.

Prior to present step (c), the solid residue is contained in polar solvent, which may be an aqueous solution, forming a suspension. In the case that the extraction of the Li-compound(s) is done in two or more steps as described above the solid residue will be contained in the slurry of the second or last step, respectively.

The solid residue obtained in step (c) is recovered by the solid-liquid separation step (c). This can be a filtration or centrifugation or a kind of sedimentation and decantation, optionally with subsequent washing steps applying the respective polar solvent used in step (b) as washing medium. The filtrate and washing liquids are usually combined before the recovery of the lithium salts. In order to recover such solid material containing fine particles, for example with an average diameter of 50 μm or less, flocculants may be added, for example polyacrylates.

The solid residue obtained according to step (c) is characterized by a typical elemental composition which results from applying the preferred process conditions during step (b). Specifically, the solid residue is characterized by having a composition typical for battery scrap material (Li, graphite and at least one of Ni, Co, Mn present) but a significantly higher (Ni+Co+Mn) to Li weight ratio. Since battery scrap material, especially the cathode active material, is characterized by a (Ni+Co+Mn):Li weight ratio between 5 and 12, the solid residue after step (c) is characterized by its lower Li content and therefore by a (Ni+Co+Mn):Li weight ratio between 13 and 100000. Furthermore, the preferred process in step (b): is accompanied by a significantly increased calcium content, which is very low in the original particulate material provided in step (a) as mentioned above (0-0.5 wt.-%). The solid residue obtained according to step (c) is characterized by an elemental Ca weight content between 2 and 50% (relative to the dry solid).

This solid residue obtainable according to step (c) is a valuable source of materials useful for the production of new batteries; steps for the isolation of such materials are described hereinbelow.

The solid residue obtained according to step (c) may subsequently be subjected to step (d), a solid-solid separation for the removal of Ni and/or Co if present. By performing step (d), nickel is recovered as a nickel containing solid.

Step (d) of the present invention comprises a solid-solid separation step. In a preferred embodiment it is a wet solid-solid separation step. This solid-solid separation step serves to separate non-soluble components like carbon and polymers or insoluble inorganic components for example metal particles or metal oxide particles from the metallic or metal oxide components of the lithium containing transition metal oxide material. After the solid-solid separation of step (d), a solid concentrate fraction is obtained containing the majority of the Ni and if applicable of the Co in enriched form. Such solid-solid separation step may be performed by mechanical, column or pneumatic, or hybrid flotations. In many embodiments, collector compounds are added to the slurry which render the target components hydrophobic. Typical collector compounds for carbon and polymer particles are hydrocarbons or fatty alcohols which are introduced in amounts of 1 g to 50 kg/t of the solid residue obtained from step (c). It is also possible to perform the flotation in an inverse sense i.e. transforming the originally hydrophilic components into strongly hydrophobic components by special collector substances, e.g., fatty alcohol sulfates or esterquats. Preferred is the direct flotation employing hydrocarbon collectors for example mineral oils, kerosene or Diesel. In order to improve the selectivity of the flotation towards carbon and polymer particles suppressing agents can be added that reduce the amounts of entrained metallic and metal oxide components in the froth phase. Agents that can be used may be acids or bases for controlling the pH value in a range of from 3 to 9. It may also be ionic components that adsorb on the metallic or metal oxide surface e.g. sodium silicate or bipolar components like, for example, amino acids. In order to increase the efficiency of the flotation it may be advantageous to add carrier particles that form agglomerates with the hydrophobic target particles, e.g., polymer particles, carbonaceous particles, for example graphite or coal. By using magnetic carrier particles magnetic agglomerates may be formed that can be separated magnetically. In the case that the target components are paramagnetic, antiferro-, ferri- or ferromagnetic it is also possible to separate these components by a magnetic separation employing high intensity magnetic separators ("WHIMS"), medium intensity magnetic separators ("MIMS") or low intensity magnetic separators ("LIMS"). Other solid-solid separation techniques make use of the density difference of the solid constituents for example the density difference between graphite and metals or metal oxides. These techniques comprise float-sink methods employing fluids of densities intermediate to the densities of the solid components that will be separated. Another technique of this sort is the heavy media separation. Further separation techniques based on density differences are spirals and hydrocyclones.

Also combinations of at least two of the afore mentioned solid-solid separation techniques may be employed. These combinations may comprise rougher, scavenger and cleaner steps which are typical for mineral processing flow sheets.

In one preferred embodiment the solid-solid separation in step (d) is a magnetic separation.

In one embodiment of the present invention the solid material obtained from step (c) is ground prior to step (d) in order to liberate the different solid particles from one another in cases that these are somehow agglomerated for example by residual binder polymers. Such grinding is preferably performed in ball mills or stirred ball mills.

In one embodiment of the present invention, step (d) is a wet solid-solid separation employing an aqueous medium preferably water as fluid. The ratio of the fluid medium to solid material in such step (d) is typically in the range of from 1:1 to 99:1, preferably 2:1 to 9:1 by weight.

From the wet solid-solid separation of step (d), two slurries result: one containing the target transition metal containing solid material and one that contains the other components like carbonaceous materials and polymers and if applicable also some inorganic compounds. By suitable selection and if necessary combination of solid-solid separation steps at least 60% of the Ni and, if present, Co is obtained and concentrated in one fraction. Preferably at least 80 to 99% of the Ni and, if present, Co is separated.

In one embodiment of the present invention the liquid phase of the slurry fed to step (d) contains dissolved lithium. In this case one or the other or both slurries obtained from the solid-solid separation in step (d) are advantageously subjected to a solid-liquid separation in order to recover the lithium solution. The lithium solution then may be further treated in step (e).

In step (e), the solution obtained from any of the foregoing steps, e.g. step (c) and/or step (d), which contains lithium, is treated to recover the lithium as hydroxide or salts in form of solid materials.

In one embodiment of the present invention the Li-salts, especially LiOH, are recovered by evaporation of the water contained in the solution (e1). In order to produce the desired Li-salt of high purity, this evaporation may be carried out in two or more consecutive steps (e.g. e2 and e3).

Firstly, the Li containing solution from any of the foregoing steps is concentrated close to the point where the solubility limit of LiOH is reached. This step is accompanied by a solid formation (e.g. crystallization) of impurities having lower solubilities than LiOH; potential impurities can be but are not limited to $Ca(OH)_2$, $CaF_2$, $CaCO_3$, LiF. These are separated by a solid-liquid separation, e.g. by filtration or centrifugation or a kind of sedimentation and decantation. Also, a combination of two solid-liquid separation steps is possible, for example a hydrocyclone followed by a depth filter, since the remaining amount of solids to be separated is small. For the case that LiF is precipitated during this first concentration step (e2), it is preferred to re-feed the solid material to step (b).

Secondly, the filtrate obtained from solid-liquid separation after one of the concentration steps, i.e. the concentrated LiOH solution, is used in the next evaporation step (e3). LiOH of high quality can be obtained by evaporating the remaining water and a solid formation of LiOH. In case of crystallization, the crystals are separated from the remaining mother liquor, again, by solid liquid separation and are optionally washed. To concentrate the impurities, several crystallization steps followed by washing and solid-liquid separation are possible.

Any mother liquors obtained from crystallization can be subjected to further steps like evaporation, crystallization, separation (e.g. ion-exchange) and/or to a recycling by introducing the mother liquor into step (b) or (e1) or (e2).

For all the above-mentioned solidification steps subsequent drying of the solids is advantageous. Drying either below 60° C. or at higher temperatures under high humidity conditions leads to LiOH monohydrate; otherwise, at least partially water free LiOH is obtained.

For the case, the filtrate obtained after step (c) is dried by total evaporation of the polar solvent, e.g. water, according to described step (e1), a LiOH (anhydride or monohydrate) is obtained, which is of high purity (>98.5%). It contains an impurity spectrum, which is characteristic for the above described process, e.g. carbon-based impurities of less than 0.35 wt.-%.

Referring to a LiOH monohydrate the characteristic impurities are calcium, fluorine and sodium. Their typical amounts within this LiOH monohydrate are:

Ca: 100 ppm-1.29 wt.-%
F: 0.1-1.29 wt.-%
Na: 0.1-1.29 wt.-%

Furthermore, it is possible, depending on the composition of the PM, that significant amounts of zinc, aluminum, potassium and chlorine are present. In these cases, their characteristic amounts in an above described LiOH monohydrate which is obtained after step (e1) are in the following ranges:

Zn: 20 ppm-1.29 wt.-%
Al: 50 ppm-1.29 wt.-%
K: 0.1-1.29 wt.-%
Cl: 0.1-1.29 wt.-%

Depending on the drying conditions, anhydrous LiOH instead of the monohydrate is obtained. In this case, the above-mentioned characteristic amounts of impurities, which are related to the monohydrate, are higher concentrated, respectively, by a factor of 1.75 (corresponds to the molar weight of the monohydrate divided by the molar weight of the anhydrate) for 100% water free LiOH.

All steps applied including steps (b), (c), (d) and (e) are preferably carried out in inert atmosphere, e.g. nitrogen, argon, or in CO2 free air.

In one embodiment of the present invention, Li is recovered from the solution obtained in step (c) by precipitation as Li-carbonate by the addition of sodium carbonate or ammonium carbonate, or by carbonic acid formed by the dissolution of carbon dioxide, preferably under pressure (step e5).

In one embodiment this Li-carbonate is dissolved again by further adding CO2 into solution, preferably under pressure, forming dissolved LiHCO3 (e6). Impurities which may be present can be separated using state-of-the-art purification techniques, e.g. solvent extraction, precipitation and/or ion exchange. After this optional purification, Li-carbonate can be obtained by raising the temperature of the solution which directly leads to Li-carbonate precipitation (e7). Pure Li-carbonate can be obtained by subsequent solid-liquid separation.

In a preferred embodiment of the present invention, Li is recovered as LiOH.

The obtained solid Li-salts and/or LiOH may be further purified by dissolution and recrystallization as known in the art.

The solid Ni-concentrate obtained from step (c) or (d) may be subjected to a subsequent step (f) allowing the extraction of Ni and, if applicable of Co, and—if applicable—other valuable metals such as Zr contained in the Ni-concentrate. For the extraction, smelters or acidic or ammonia leaching may be applied.

In one embodiment of the present invention such step (f) can be pyrometallurgical by smelting the solid Ni-concentrate obtained in step (c) or (d) as such or as co-feed within a smelter dedicated to Ni-concentrates from mining production.

In the course of such step (f), the transition metal material may be treated with a leaching agent, which is preferably an acid selected from sulfuric acid, hydrochloric acid, nitric acid, methanesulfonic acid, oxalic acid and citric acid or a combination of at least two of the foregoing, for example a combination of nitric acid and hydrochloric acid. In another preferred form the leaching agent is an
- inorganic acid such as sulfuric acid, hydrochloric acid, nitric acid,
- an organic acid such as methanesulfonic acid, oxalic acid, citric acid, aspartic acid, malic acid, ascorbic acid, or glycine,
- a base, such as ammonia, aqueous solutions of amines, ammonia, ammonium carbonate or a mixture of ammonia and carbon dioxide, or
- a chelating agent, such as Na4EDTA, Na2H2EDTA, H4EDTA (in the following sections these three chelating agents are summarized writing just EDTA) or dimethylglyoxime.

In one form, the leaching agent comprises an aqueous acid, such as an inorganic or organic aqueous acid. In another form the leaching agent comprises a base, preferable ammonia or an amine. In another form the leaching agent comprises a complex former, preferably a chelating agent. In another form the leaching agent comprises an inorganic acid, an organic acid, a base or a chelating agent.

The concentration of leaching agents may be varied in a wide range, for example of 0.1 to 98% by weight and preferably in a range between 10 and 80%. Preferred example of aqueous acids is aqueous sulfuric acid, for example with a concentration in the range of from 10 to 98% by weight. Preferably, aqueous acid has a pH value in the range of from −1 to 2. The amount of acid is adjusted to maintain an excess of acid referring to the transition metal. Preferably, at the end of step (f) the pH value of the resulting solution is in the range of from −0.5 to 2.5. Preferred examples of a base as leaching agents are aqueous ammonia with a molar NH3 to metal (Ni, Co) ratio of 1:1 to 6:1, preferably 2:1 to 4:1, preferably also in the presence of carbonate or sulfate ions. Suitable chelating agents like EDTA or dimethylglyoxime are often applied in a molar ratio of 1:1 to 3:1.

The leaching may be carried out in the presence of oxidizing agents. A preferred oxidizing agent is oxygen as pure gas or in mixtures with inert gases e.g. nitrogen or as air. Other oxidizing agents are oxidizing acids, e.g. nitric acid, or peroxides like hydrogen peroxide.

In one embodiment of the present invention such step (f) can be performed by dissolving the solid Ni-concentrate obtained in step (c) or (d) in an acid selected from sulfuric acid, hydrochloric acid, nitric acid, methane sulfonic acid, oxalic acid and citric acid.

In one embodiment of the present invention such step (f) may be performed by treating the solid Ni-concentrate obtained in step (c) or (d) with an aqueous solution of ammonium carbonate or ammonium bicarbonate. Such aqueous solution may contain additional ammonia.

In one embodiment of the present invention the Ni-concentrate obtained from step (c) or (d) is treated in step (f) with an acid selected from sulfuric acid, hydrochloric acid, nitric acid, methanesulfonic acid, oxalic acid and citric acid or a combination of at least two of the foregoing, for example a combination of nitric acid and hydrochloric acid. In the case of aqueous acids the concentration of acid may be varied in a wide range, for example of 0.1 to 99% by weight preferably in a range between 10 and 96%. The amount of acid is adjusted to maintain an excess of acid. Preferably, at the end of step (f) the pH value of the resulting solution is in the range of from −0.5 to 2.

Preferred example of aqueous acids is aqueous sulfuric acid, for example with a concentration in the range of from 10 to 98% by weight.

The treatment in accordance with step (f) may be performed at a temperature in the range of from 20 to 200° C., especially 20 to 130° C. If temperatures above 100° C. are desired, step (f) is carried out at a pressure above 1 bar. Otherwise, normal pressure is preferred.

In one embodiment of the present invention, step (f) is carried out in a vessel that is protected against strong acids, for example molybdenum and copper rich steel alloys, nickel-based alloys, duplex stainless steel or glass-lined or enamel or titanium coated steel. Further examples are polymer liners and polymer vessels from acid-resistant polymers, for example polyethylene such as HDPE and UHMPE, fluorinated polyethylene, perfluoroalkoxy alkanes ("PFA"), polytetrafluoroethylene ("PTFE"), PVDF and FEP. FEP stands for fluorinated ethylene propylene polymer, a copolymer from tetrafluoroethylene and hexafluoropropylene The slurry obtained from step (f) may be stirred, agitated, or subjected to a grinding treatment, for example in a ball mill or stirred ball mill. Such grinding treatment leads often to a better access of water or acid to a particulate transition metal material.

In one embodiment of the present invention, step (f) has a duration in the range of from 10 minutes to 10 hours, preferably 1 to 3 hours. For example, the reaction mixture in step (f) is stirred at powers of at least 0.1 W/l or cycled by pumping in order to achieve a good mixing and to avoid settling of insoluble components. Shearing can be further improved by employing baffles. All these shearing devices need to be applied sufficiently corrosion resistant and may be produced from similar materials and coatings as described for the vessel itself.

Step (f) may be performed under an atmosphere of air or under air diluted with $N_2$. It is preferred, though, to perform step (f) under inert atmosphere, for example nitrogen or a rare gas such as Ar.

The treatment in accordance with step (f) leads to a dissolution of the metal compounds that remain after the leaching of the LiOH in step (b), including impurities other than carbon and organic polymers. In most embodiments, a slurry is obtained after carrying out step (f). Residual lithium and transition metals such as, but not limited to nickel, cobalt, copper and, if applicable, manganese, are often in dissolved form in the leach, e.g. in the form of their salts.

In embodiments wherein a so-called oxidizing acid has been used in step (f) it is preferred to add reducing agent in order to remove non-used oxidant. Examples of oxidizing acids are nitric acid and combinations of nitric acid with hydrochloric acid. In the context of the present invention, hydrochloric acid, sulfuric acid and methanesulfonic acid are preferred examples of non-oxidizing acids.

In one embodiment step (f) is performed under inert gas like nitrogen or argon.

Depending on the concentration and amount of the aqueous acid used in step (f), the liquid phase obtained in step (f) may have a transition metal concentration in the range of from 1 up to 25% by weight, preferably 6 to 15% by weight. The transition metal concentration depends on the solubility of the corresponding salts of the acid employed. Preferably, step (f) is performed such that the transition metal concentrations of the main metals such as Ni and, optionally, Co and Mn are slightly below the solubility limit of the least soluble salt in order to ensure a high metal concentration in the solution.

An optional step that may be carried out after step (f) is removal of non-dissolved solids, for example carbonaceous materials and of polymers resulting from the housings of batteries. Said step may be carried out by filtration centrifugation or settling and decanting with or without addition of flocculants. The solid residue obtained may be washed with water and can be further treated in order to separate the carbonaceous and polymeric components e.g. by solid-solid separation methods as described above.

In one embodiment of the present invention step (f) and the removal of non-dissolved solids are performed sequentially in a continuous operation mode.

Having dissolved the Ni-concentrate in step (f) in a consecutive step (f1), the pH value of the above slurry or solution may be adjusted to 2.5 to 8, preferably 5.5 to 7.5 and even more preferably from 6 to 7. The pH value may be determined by conventional means, for example potentiometrically, and refers to the pH value of the continuous liquid phase at 20° C. The adjustment of the pH value is done by dilution with water or by addition of bases or by a combination thereof. Examples of suitable bases are ammonia and alkali metal hydroxides, for example LiOH, NaOH or KOH, in solid form, for example as pellets, or preferably as aqueous solutions. Combinations of at least two of the foregoing are feasible as well, for example combinations of ammonia and aqueous caustic soda.

Preferably, an optional step (f2) comprises the removal of precipitates of carbonates, oxides, phosphates, hydroxides or oxyhydroxides of Al, Cu, Fe, Zr, Zn, or combinations of at least two of the foregoing formed in the optional step (f1). Said precipitates may form during adjustment of the pH value. Phosphates may be stoichiometric or basic phosphates.

Without wishing to be bound by any theory, phosphates may be generated on the occasion of phosphate formation through hydrolysis of hexafluorophosphate or its decomposition products formed during pretreatment of the particulate material provided in present step (a). It is possible to remove said precipitates by filtration or with the help of a centrifuge or by sedimentation. Preferred filters are belt filters, filter press, suction filters, and cross-flow filter. Filtering aids and/or flocculants may be added to improve the solid-liquid separation.

In a preferred embodiment of the present invention, step (f2) includes an optional step (f3). Step (f3) includes a treatment of a solution obtained after step (f1) or step (f2) with metallic nickel, metallic cobalt or metallic manganese or any combination of at least two of the foregoing.

In optional step (f3), a solution obtained after step (f2) is contacted with metallic nickel, cobalt or manganese or a combination of at least two of the foregoing, for example in a column. In such embodiments, it is advantageous to provide a column packed with metallic nickel, metallic cobalt or metallic manganese or a combination of at least two of the foregoing in the form of lumps or granules, for example as fixed bed, and allowing a stream of the solution to flow through such column.

In one embodiment of the present invention, step (f3) is performed at normal pressure.

In one embodiment of the present invention, step (f3) has a duration in the range of from 30 minutes to 5 hours. In case step (f3) is performed in a column, the duration corresponds to the average residence time.

In one embodiment of the present invention, step (f3) is performed at a pH value range from 1 to 6, preferably pH 2 to 5. The lower the pH value in step (f3) the higher is the amount of metal selected from Ni, Co and Mn to be dissolved under hydrogen formation.

Step (f3) is particularly useful for removal of copper traces. By performing step (f3), no new impurities that would require an additional purification step are introduced into the solution of transition metals. Even if said metallic nickel, cobalt or manganese contains traces of copper they do not dissolve.

The copper separation in step (f3) may also be performed by electrolysis preferably employing an electrochemical filter cell employing conductive particulate material as electrode e.g. the graphite contained in the black mass.

Alternatively, copper may be extracted by solvent extraction or ion-exchange prior to the precipitation of Al, Fe, Zr and/or Zn, and may be recovered as high grade copper by electrowinning.

From the mixed Ni, Co and/or Mn containing solution, the individual metals may be recovered as pure metal salts according to known procedures in the art e.g. precipitation as oxides, hydroxides, carbonates or sulfides, solvent extraction, ion exchange, electrowinning. These pure metal salts may be re-introduced to the synthesis of cathode active materials e.g. according to the following steps (g1) and (g).

An optional step (g), typically performed subsequent to step (f) and optional steps (f1), (f2), (f3), includes the precipitation of the transition metals as mixed hydroxides or mixed carbonates, preferably as mixed hydroxides.

In a preferred embodiment of the present invention, step (g) is performed by adding ammonia or an organic amine such as dimethyl amine or diethyl amine, preferably ammonia, and at least one inorganic base such as lithium hydroxide, sodium hydroxide, potassium hydroxide, sodium carbonate, sodium bicarbonate, potassium carbonate or potassium bicarbonate or a combination of at least two of the foregoing. Preferred is the addition of ammonia and sodium hydroxide.

In one embodiment of the present invention, step (g) is performed at a temperature in the range of from 10 to 85° C., preferred are 20 to 50° C. In one embodiment of the present invention, the concentration of organic amine—or ammonia—is in the range of from 0.05 to 1 mole/l, preferably 0.1 to 0.7 mole/l. The term "ammonia concentration" in this context includes the concentration of ammonia and ammonium. Particular preference is given to amounts of ammonia for which the solubility of $Ni^{2+}$ and $Co^{2+}$ in the mother liquor is not more than 1000 ppm each, more preferably not more than 500 ppm each.

In one embodiment of the present invention, mixing is affected during step (g) of the inventive process, for example with a stirrer, a rotor stator mixer or a ball mill. Preference is given to introducing a stirrer output of at least 1 W/l into the reaction mixture, preferably at least 3 W/l and more preferably at least 5 W/l. In one embodiment of the present invention, a stirrer output of not more than 25 W/l can be introduced into the reaction mixture.

The optional step (g) of the inventive process may be performed in the presence or absence of one or more reducing agents. Examples of suitable reducing agents are hydrazine, primary alcohols such as, but not limited to methanol or ethanol, furthermore ascorbic acid, glucose and alkali metal sulfites. It is preferred to not use any reducing agent in step (g). The use of a reducing agent or inert atmosphere or both in combination is preferred in cases where major amounts of manganese are present in the transition metal oxide material, for example, at least 3 mol-%, referring to the transition metal part of the respective cathode active material.

Step (g) of the inventive process may be performed under an atmosphere of an inert gas like e.g. nitrogen or argon or carbon dioxide.

In one embodiment of the present invention, step (g) is performed at a pH value in the range of from 9 to 13.5, preferred are pH values from 11 to 12.5 in the case of hydroxides and pH values in the range from 7.5 to 8.5 in the case of carbonates. The pH value refers to the pH value in the mother liquor, determined at 23° C.

Step (g) may be carried out in a batch reactor or—preferably—continuously, for example in a continuous stirred tank reactor or in a cascade of two or more, for example two or three continuous stirred tank reactors.

Step (g) of the inventive process may be performed under air, under inert gas atmosphere, for example under noble gas or nitrogen atmosphere, or under reducing atmosphere. An example of a reducing gas is, for example, $SO_2$. Preference is given to working under inert gas atmosphere, especially under nitrogen gas.

For the purpose of further purification, the solids recovered in step (g) may be separated off and dissolved in an acid, for example hydrochloric acid or more preferably sulfuric acid.

By performing the inventive process, it is possible to recover the transition metals nickel and, if applicable, cobalt and/or manganese from cathode materials containing nickel and cobalt and—if applicable, also manganese, in a form that they can be converted into cathode active materials very easily. In particular, the inventive process allows the recovery of transition metals such as nickel and, optionally, cobalt and/or manganese, that contain only tolerable traces of impurities such as copper, iron, and zinc, for example with less than 10 ppm of copper, preferably even less, for example 1 to 5 ppm.

In one embodiment of the present invention, in an additional step (g1) prior to step (g), nickel, cobalt and/or manganese salts are added to the recycled metal salt solution from step (f) or (f1), (f2) or (f3) to adjust the metal ratio to the composition of a desired mixed metal hydroxide precipitate, which may be employed as precursor material for the production of cathode active material. During such precipitation, additional metal salts may be added, preferably as an aqueous solution of anions of acids employed in step (f); an examples of such a metal is aluminum which may be added as aluminum sulfate. The mixed metal hydroxide precipitate may be separated from the liquid by solid-liquid separation and dried to obtain a dry mixed metal hydroxide precipitate with a water content of not more than 10 wt %. By this, a cathode active material precursor can be obtained directly in the consecutive precipitation step (g). The mixed metal hydroxide precipitate obtained in step (g) may be further treated as dried powder with lithium salt preferably lithium carbonate and most preferably with lithium hydroxide. The lithium salts preferably obtained from the present inventive process step (e) may be dry mixed with the dry mixed metal hydroxide precipitate and subjected to a calcination process comprising a temperature range from 400 to 900° C. preferably 450 to 800° C. By this a mixed lithium containing metal oxide containing nickel and/or cobalt can be obtained.

In one embodiment of the present invention, the solid Ni-concentrate obtained in step (d) is treated with ammonium (bi)carbonate in aqueous solution in concentrations of 0.2 to 30 wt %, preferably 1 to 20% by weight. The slurry may be heated to temperatures of 30 to 150° C. At temperatures above the boiling point of the mixture the heating is performed under pressure. Below the boiling point the application of pressure is advantageous to maintain sufficient ammonia and carbon dioxide in the system.

The treatment with ammonium (bi)carbonate may be performed under inert atmosphere or in the presence of oxygen for example under air. The leachate or solution may also contain additional ammonia and/or hydrogen peroxide.

By the ammonium (bi)carbonate treatment Ni and, if applicable, Co and Cu, will be dissolved as ammonium complexes. The concentration of the metal ammonium complexes in the leaching liquor may be in the range of 0.2 to 30 wt % by metal preferably 1-15 wt %. The solution obtained by this treatment is subjected to a solid-liquid separation resulting in a solution containing mainly the Ni and if applicable Co and Cu ammonium complexes and a separated solid residue containing mainly other transition metals if applicable namely Mn and Fe.

The solution obtained can be heated and ammonia can be stripped off by purging with carbon dioxide. By this first Ni-carbonate and upon longer treatment advantageously at increased temperature also Co-carbonate will be obtained as precipitates. This allows the separation of both metals. In one embodiment of the present invention Ni and Co carbonate are not separated from each other. The precipitated mixed Ni/Co carbonates are separated from the mother liquor and can be dissolved by sulfuric acid or other acids to obtain a solution of the corresponding Ni and if applicable Co salts. This solution may also contain small amounts of Cu-salts that may be removed by a treatment with metallic Ni, Co or Mn as described above. Other impurities like Fe or Al that may be contained in low concentrations may be removed by hydroxide or carbonate precipitation at pH-values between 2.5 to 8 as described above as well.

From the purified Ni- and if applicable Co-salt solution Ni- and Co-hydroxides may be coprecipitated.

In one embodiment of the present invention the solution is further treated to extract Ni and Co-salts separately for example by solvent extraction methods. From the separated Ni and Co salts pure metals can be recovered via electrochemical methods known in the art.

In one embodiment the precipitation of the transition metals after steps (f1), (f2) and (f3) is done by hydrogen under elevated pressure. For this the pH-value of the solution is kept basic by addition of ammonia and/or ammonium carbonate. By this Ni, Co and Cu can be precipitated as metals. Certain catalysts known in the art may be added to improve this reaction.

Description of Methods:

Particle size distribution measurements, including determination of D50, are performed according to ISO 13320 EN:2009-10.

Elemental analysis of lithium, calcium and manganese (performed inter alia for determining the Li, Ca, Mn content of the particulate material provided in present step (a)):

Reagents are:

Deionized water, hydrochloric acid (36%), K2CO3-Na2CO3 mixture (dry), Na2B4O7 (dry), hydrochloric acid 50 vol.-% (1:1 mixture of deionized water and hydrochloric acid (36%)); all reagents are p.a. grade.

Sample Preparation:

0.2-0.25 g of the particulate material for present step (a) (typically obtained from waste lithium ion batteries after performing the preliminary reduction step (i)) is weighed into a Pt crucible and a K2CO3-Na2CO3/Na2B4O7 fusion digestion is applied: The sample is burned in an unshielded flame and subsequently completely ashed in a muffle furnace at 600° C. The remaining ash is mixed with K2CO3-Na2CO3/Na2B4O7 (0.8 g/0.2 g) and melted until a clear melt is obtained. The cooled melting cake is dissolved in 30 mL of water, and 12 mL of 50 vol.-% hydrochloric acid is added. The solution is filled up to a defined volume of 100 mL. This work up is repeated three times independently; additionally, a blank sample is prepared for reference purposes.

Measurement:

Li, Ca, Mn within the obtained solution is determined by optical emission spectroscopy using an inductively coupled plasma (ICP-OES). Instrument: ICP-OES Agilent 5100 SVDV; wavelengths: Li 670.783 nm; Ca 396.847 nm; Mn 257.610 nm; internal standard: Sc 361.383 nm; dilution factors: Li 100, Ca 10, Mn 100; calibration: external.

Elemental analysis of fluorine and fluoride is performed in accordance with standardized methods: DIN EN 14582:2016-12 with regard to the sample preparation for the overall fluorine content determination (waste samples); the detection method is an ion selective electrode measurement. DIN 38405-D4-2:1985-07 (water samples; digestion of inorganic solids with subsequent acid-supported distillation and fluoride determination using ion selective electrode).

Other metal impurities and phosphorous are determined analogously by elemental analysis using ICP-OES (inductively coupled plasma-optical emission spectroscopy) or ICP-MS (inductively coupled plasma-mass spectrometry). Total carbon is determined with a thermal conductivity detector after combustion.

Phase compositions of solids [including the identification of manganese(II)oxide, and Ni and Co in an oxidation state lower than +2 (typically metallic) in the particulate material provided in present step (a)] are determined with powder x-ray diffraction (PXRD). The method is performed as follows:

The sample is ground to fine powder and filled in the sample holder.

Two devices, each using its specific radiation source, are employed:

(1) Measurement applying Cu radiation: The instrument used is a Bruker D8 Advance Series 2 with an auto-sampling unit; primary side: Cu-anode, beam spread angle aperture 0.1° with ASS; secondary side: Scattered beam aperture 8 mm with Ni 0.5 mm, Soller 4°, Lynx-Eye (3° aperture).

(2) Measurement applying Mo radiation: The instrument used is a Bruker D8 Discover A25 with an auto-sampling unit; primary side: Mo-anode with Johansson monochromator (Mo—K-alpha1) with axial soller 2.5°; secondary side: ASS, Soller 2.5°, Lynx-Eye XE detector (3.77° aperture).

References are used to identify matches with the obtained reflection pattern. All relevant phases are well known in the literature; the following references are consulted and used in order to calculate the theoretical diffraction pattern (see position and intensity of reflections in Table 1 below):

a) $Co_xNi_{1-x}$; space group Fm-3m;
  x=0.5: Taylor et al., J. Inst. Met. (1950) 77, 585-594.
  x=0: Buschow et al.; J. Magn. Magn. Mater. 1983, 38, 1-22.

b) Co; space group $P6_3/mmc$; Buschow et al.; J. Magn. Magn. Mater. 1983, 38, 1-22.

c) Li2CO3, space group C2/c; J. Alloys Compd. (2011), 509, 7915-7921 d) LiAlO2, space group R-3m; Marezio et al., J. Chem. Phys. (1966) 44, 3143-3145.

e) MnO, space group Fm-3m, Locmelis et al., Z. Anorg. Allg. Chem. 1999, 625, 1573.

TABLE 1

Characteristic reflections (position given in °2theta and relative intensity in %) of CoxNi1 − x, Co, Li2CO3, LiAlO2 and MnO with intensities >10% and 2theta <80° for Cu K alpha 1 radiation):

| Compound | hkl | 2 theta [%] | rel intensity [%] |
| --- | --- | --- | --- |
| $Co_{0.5}Ni_{0.5}$ | 111 | 44.36 | 100 |
|  | 200 | 51.68 | 46 |
|  | 220 | 76.12 | 24 |
| Ni | 111 | 44.50 | 100 |
|  | 200 | 51.84 | 46 |
|  | 220 | 76.38 | 24 |
| Co | 100 | 41.74 | 25 |
|  | 002 | 44.62 | 27 |
|  | 101 | 47.60 | 100 |
|  | 102 | 62.74 | 13 |
|  | 110 | 76.20 | 14 |
| Li2CO3 | 1 1 0 | 21.24 | 100 |
|  | 2 0 0 | 23.30 | 19 |
|  | 2 0 −2 | 30.44 | 98 |
|  | 0 0 2 | 31.76 | 96 |
|  | 1 1 −2 | 34.00 | 83 |
|  | 3 1 −1 | 36.72 | 81 |
|  | 0 2 1 | 39.44 | 39 |
|  | 2 2 −1 | 42.48 | 22 |
|  | 3 1 1 | 48.58 | 52 |

TABLE 1-continued

Characteristic reflections (position given in °2theta and relative intensity in %) of CoxNi1 − x, Co, Li2CO3, LiAlO2 and MnO with intensities >10% and 2theta <80° for Cu K alpha 1 radiation):

| Compound | hkl | 2 theta [°] | rel intensity [%] |
|---|---|---|---|
| | 4 2 −1 | 57.34 | 11 |
| | 2 2 −3 | 57.90 | 19 |
| | 2 0 −4 | 59.58 | 20 |
| | 5 1 −3 | 62.86 | 12 |
| LiAlO2 | 003 | 18.72 | 100 |
| | 101 | 37.60 | 17 |
| | 104 | 45.22 | 98 |
| | 107 | 59.30 | 17 |
| | 018 | 65.02 | 23 |
| | 110 | 66.76 | 27 |
| MnO | 111 | 34.94 | 60 |
| | 200 | 40.58 | 100 |
| | 220 | 58.72 | 58 |
| | 311 | 70.20 | 23 |
| | 222 | 73.82 | 17 |

In case of characteristic reflections overlapping with reflections of different crystalline phases (especially graphite, which contributes the largest fraction of the sample), an additional measurement employing an alternative radiation source (e.g. Mo K alpha instead of Cu K alpha) is performed.

Abbreviations

In the context of the present invention, normal pressure means 1 atm or 1013 mbar. "Normal conditions" mean normal pressure and 20° C. Nl stands for normal liter, liter at normal conditions (1 atm, 20° C.). PFA stands for perfluoroalkoxy polymer.

Percentages refer to % by weight unless specifically defined otherwise. The expressions % by weight and wt % may be used interchangeably. Wherever mentioned, the terms "room temperature" and "ambient temperature" denote a temperature between about 18 and 25° C. XRD denotes powder x-ray investigation (radiation as indicated, typically Cu k-alpha1 radiation of 154 pm or Mo k-alpha1 of 71 pm).

The invention is further illustrated by the following examples.

EXAMPLE 1: SYNTHETIC EDUCT SAMPLE

An amount of 200 g simulated spent battery scrap containing
- 78.8 g spent cathode active material containing nickel, cobalt and manganese in similar molar amounts, approximate formula Li(Ni0.34Co0.33Mn0.33)O2,
- 62.2 of organic carbon in the form of graphite and soot
- 47.0 g of organic electrolyte mixture (containing LiPF6)
- 7.4 g polyvinylidene fluoride as binder,
- 2.4 g aluminum powder,
- 0.2 g iron powder,
- 2.0 g copper metal is placed into a 500-mL quartz round bottom flask and attached to a rotary evaporator in a way that the flask was immersed in an oven. Within 4.5 hours the rotating flask was heated to 800° C. in the course of 2 hours under a flow of argon (20 l/h) and held at this temperature for 1 hour under a flow of dry air (20 l/h) before cooling down to ambient temperature. An amount of 173.3 g heat treat material was obtained comprising a phase composition of Ni/Co-alloy, iron manganese oxide, Li2CO3, LiF, and graphite.

EXAMPLE 1a: PROVIDING A REDUCED MASS FROM WASTE LITHIUM ION BATTERIES

An amount of ~1 t mechanically treated battery scrap containing spent cathode active material containing nickel, cobalt and manganese, organic carbon in the form of graphite and soot and residual electrolyte, and further impurities inter alia comprising fluorine compounds, phosphorous and calcium is treated to obtain a reduced mass according to the process described in Jia Li et al., Journal of Hazardous Materials 302 (2016) 97-104. The atmosphere within the roasting system is air whose oxygen reacts with the carbon in the battery scrap to form carbon monoxide, treatment temperature is 800° C.

After reaction and cool down to ambient temperature, the heat-treated material is recovered from the furnace, mechanically treated to obtain a particulate material and analyzed by means of X-ray powder diffraction (FIGS. 1, 2: Mo Ka radiation, FIGS. 3, 4: Cu Ka radiation), elemental analysis (Tab. 2) and particle size distribution (Tab. 3).

The Li content is 3.6 wt.-%, which acts as reference for all further leaching examples (see below). Fluorine is mainly represented as inorganic fluoride (88%). Particle sizes are well below 1 mm; D50 is determined to be 17.36 μm.

Comparing the obtained XRD pattern with calculated reference patterns of Ni (which is identical with that one of CoxNi1−x, x=0-0.6), Co, Li2CO3 and LiAlO2 (see reference patterns in Tab. 1), it can be concluded that Ni is exclusively present as metallic phase, either as pure Ni or as an alloy in combination with Co. For clarity, this result is confirmed by applying two different radiation sources. The presence of metallic nickel is supported by the qualitative observation that the whole sample shows typical ferromagnetic behavior when it gets in touch with a permanent magnetic material. As lithium salts, Li2CO3 as well as LiAlO2 are clearly identified by their characteristic diffraction pattern.

The composition of the black powder (PM) obtained is shown in Table 2.

TABLE 2

| Composition of reduced black powder (PM) | |
|---|---|
| F | 2.6 g [i.e. 0.14 mol]/100 g |
| (ionic F thereof) | (2.3 g [i.e. 0.12 mol]/100 g) |
| C (inorganic C thereof) | 31.3 g/100 g (1.2 g/100 g) |
| Ca | 0.16 g [i.e. 0.004 mol]/100 g |
| Co | 9.5 g/100 g |
| Cu | 3.4 g/100 g |
| Li | 3.6 g/100 g |
| Mn | 5.8 g/100 g |
| Ni | 4.8 g/100 g |
| P | 0.36 g/100 g |

TABLE 3

Results on particle size distribution measurement of reduced mass from waste lithium ion batteries after heat treatment.

| D10 [μm] | D50 [μm] | D80 [μm] | D90 [μm] |
|---|---|---|---|
| 3.46 | 17.36 | 33.86 | 48.92 |

EXAMPLE 2: LEACHING WITH CA(OH)2

An amount of 5 g of the above-mentioned reduced battery scrap material (obtained as shown in Example 1a) is filled an a PFA flask and mixed with 5, 1.5, 1.0 and 0.5 g of solid Ca(OH)2, respectively. 200 g of water are added with stirring, and the whole mixture is refluxed for 4 hours.

After 4 hours, the solid content is filtrated off and filtrate samples are taken and analyzed with regard to Li, F, carbonate, OH, and Ca. Results are compiled in the below Table 4.

TABLE 4

Analyzed filtrates after Li leaching with Ca(OH)2.

| Amount of Ca(OH)$_2$ [g] | Lithium content [mg] | Fluoride content [mg] | Li leaching efficiency [%] |
|---|---|---|---|
| 0.5 | 144 | 46 | 80 |
| 1.0 | 154 | 12 | 84 |
| 1.5 | 156 | 4 | 86 |
| 5 | 162 | 4 | 90 |

EXAMPLE 2a: LEACHING WITH CA(OH)2, ADDITION OF SOLIDS TO LIQUID

Example 2 is repeated except that 5 g of the black powder obtained as shown in Example 1a, and the designated amount of solid Ca(OH)2, are added simultaneously to 200 g of water with stirring. Results are analogous to those reported in Table 4.

EXAMPLE 3: HIGHER SOLID CONTENT

An amount of 10, 20 and 30 g, respectively, of the particulate material (PM) described in example 1a is filled an a PFA flask and mixed with solid Ca(OH)2 in a fixed weight ratio of PM:Ca(OH)2=3.3:1. The further treatment with addition of 200 g of water follows example 2 except that each sample is refluxed for 6 hours. Results are shown in Table 5. Based on these results, it is concluded that the efficiency of the present leaching process is not affected by the PM solid content.

TABLE 5

Analyzed filtrates after Li leaching with Ca(OH)2.

| Amount of material from example 1 | Lithium content [mg] | Fluoride content [mg] | Li leaching efficiency |
|---|---|---|---|
| 10 g | 322 | 10 | 89% |
| 20 g | 624 | 20 | 86% |
| 30 g | 987 | 30 | 91% |

EXAMPLE 4: VARIATION OF PARAMETERS

Following the procedure of Example 2a, solid Ca(OH)2 and the particulate material (PM) described in example 1a is added with stirring (3 stages cross-beam stirrer, 60 mm diameter) to 836.8 g of pre-heated water in a glass reactor with baffles. The stirring is continued at constant temperature for the time period (t) indicated in Tab. 6, after which the solid is filtered off and filtrate samples are analyzed. Amounts of Ca(OH)2 and PM, temperatures, stirring parameters, and analysis results (%=g found in 100 g of filtrate) are also compiled in Table 6.

TABLE 6

| Sample | t [h] | Li [%] | F$^-$ [%] | recovered Li [%] |
|---|---|---|---|---|
| 125.5 g PM, | 0 | | | |
| 37.7 g Ca(OH)$_2$ | 2 | 0.28 | 0.024 | 55% |
| T = 70° C., | 3 | 0.28 | 0.022 | 55% |
| stir with 525 rpm | 4 | 0.30 | 0.021 | 59% |
| (0.85 W/kg) | 6 | 0.33 | 0.014 | 65% |
| | 24 | 0.41 | 0.007 | 80% |
| 125.5 g PM, | 0 | | | |
| 37.7 g Ca(OH)$_2$ | 2 | 0.41 | 0.016 | 80% |
| T = 95° C., | 3 | 0.43 | 0.015 | 84% |
| stir with 525 rpm | 4 | 0.44 | 0.015 | 86% |
| (0.85 W/kg) | 6 | 0.47 | 0.014 | 92% |
| | 24 | 0.48 | 0.014 | 94% |
| 125.5 g PM, | 0 | | | |
| 37.7 g Ca(OH)$_2$ | 2 | 0.42 | 0.014 | 82% |
| T = 98° C., | 3 | 0.43 | 0.013 | 84% |
| stir with 950 rpm | 4 | 0.45 | 0.013 | 88% |
| (5 W/kg) | 6 | 0.45 | 0.013 | 88% |
| | 24 | 0.48 | 0.016 | 94% |
| 167.4 g PM, | 0 | | | |
| 50.2 g Ca(OH)$_2$ | 2 | 0.49 | 0.019 | 72% |
| T = 98° C., | 3 | 0.53 | 0.018 | 78% |
| stir with 600 rpm | 4 | 0.54 | 0.018 | 79% |
| (1.3 W/kg) | 6 | 0.55 | 0.018 | 81% |
| | 24 | 0.64 | 0.029 | 94% |

EXAMPLE 5: SOLID LIOH FROM LEACHED LITHIUM FILTRATE

A filtrate obtained from a process according to example 2 is further treated according to the above described step (e1) to yield solid LiOH as monohydrate: 1 L of a filtrate containing 0.21 wt.-% lithium is concentrated by evaporation (40° C., 42 mbar) and finally dried applying 40° C. and a constant flow of nitrogen for 24 h. FIG. 5 shows the obtained LiOH monohydrate with minor impurities of Li2CO3. The latter is due to contact with air during almost all process steps. Next to carbon-based impurities, elemental analysis reveals as main impurities (>200 ppm) F, Na, Ca, K and Cl and minor impurities (<200 ppm) of Al and Zn.

Figure 1:
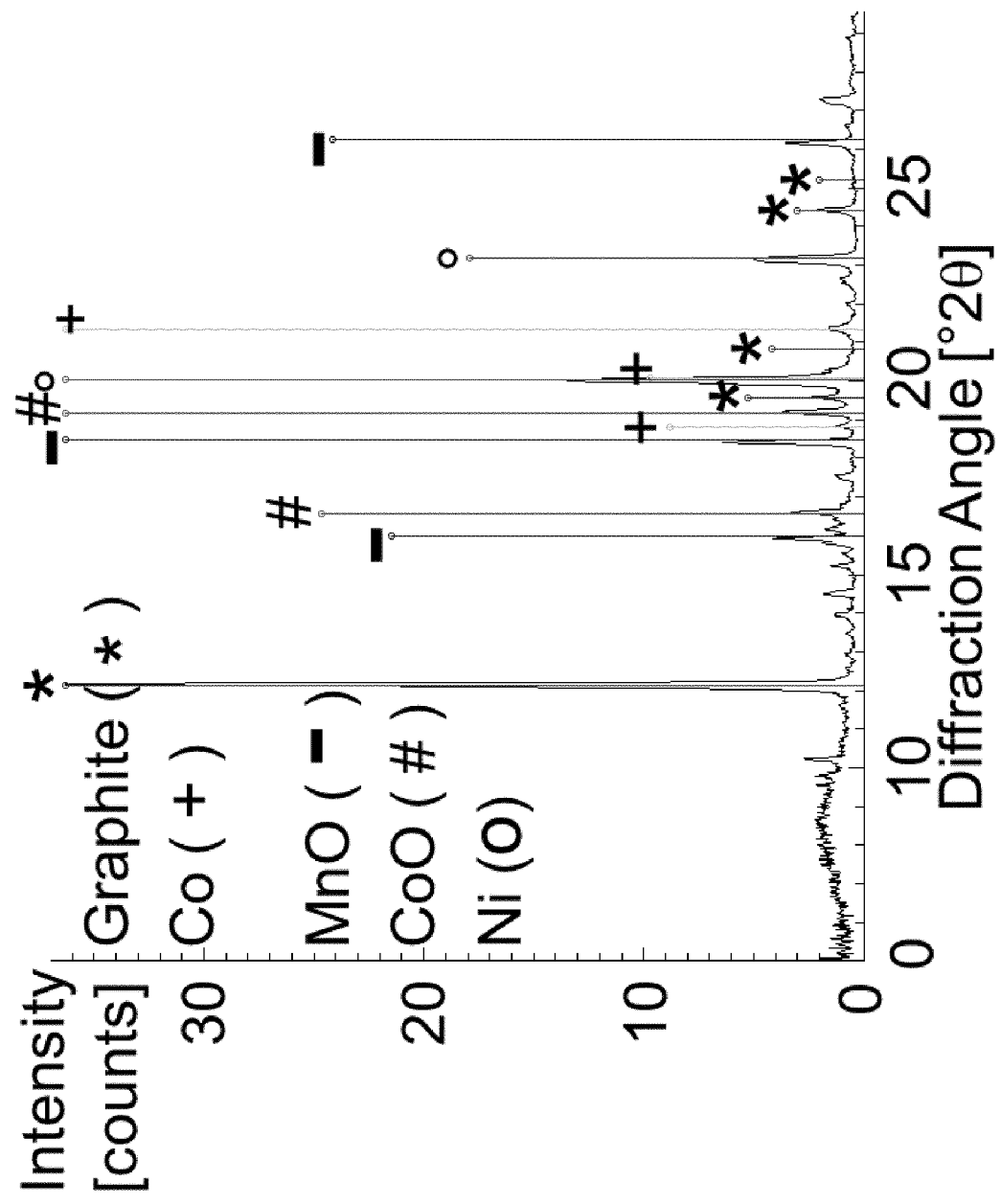
FIG. 1: X-ray powder diffractogram (Mo Kα) of reduced mass from waste lithium ion batteries after heat/reduction treatment as obtained in example 1a and used in example 2a including reference diffractograms of graphite, cobalt, manganese-II-oxide, cobalt oxide, and nickel.
Figure 2:
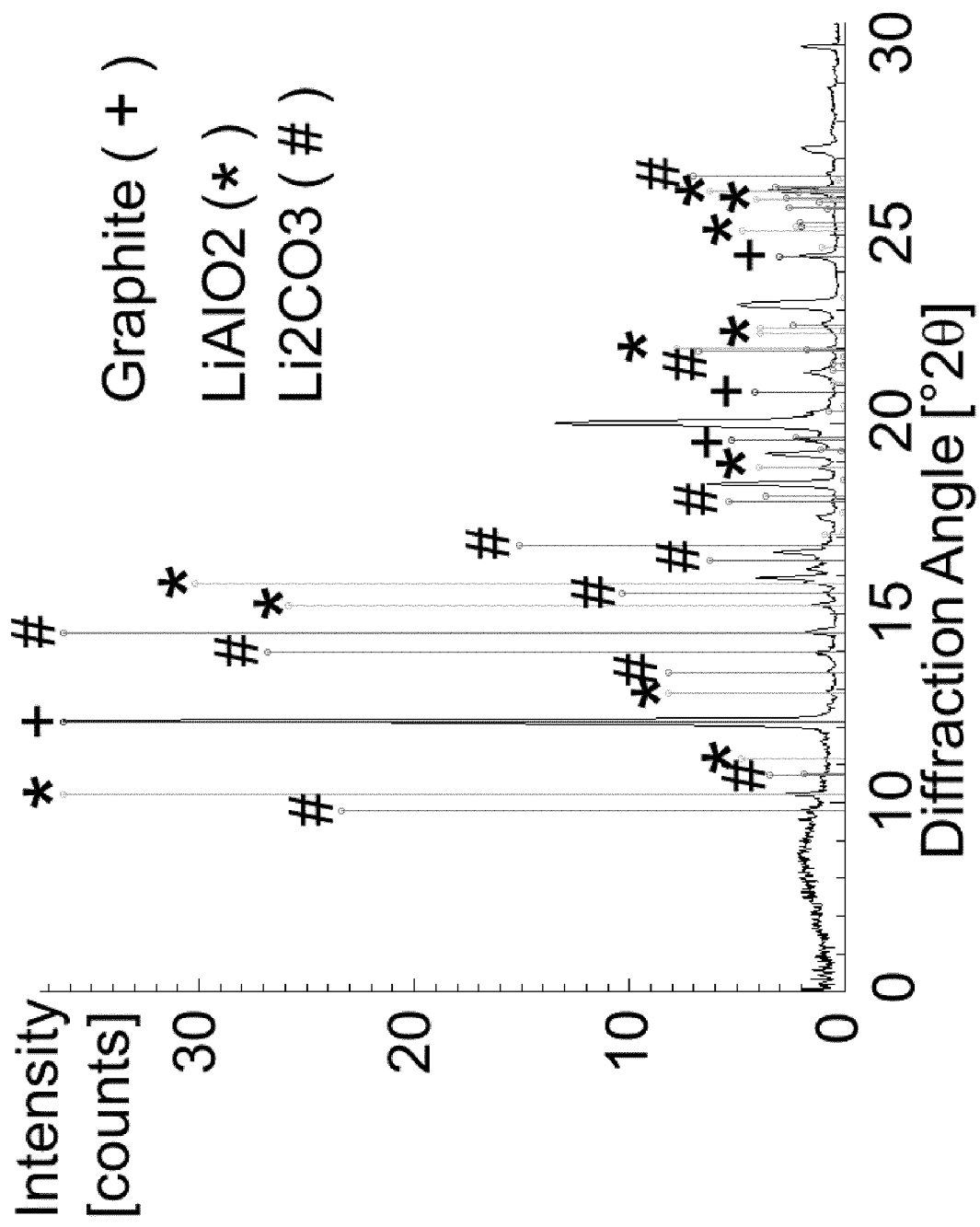
FIG. 2: X-ray powder diffractogram (Mo Kα) of reduced mass from waste lithium ion batteries after heat/reduction treatment as obtained in example 1a and used in example 2a including reference diffractograms of graphite, lithium aluminate, and lithium carbonate.
Figure 3:
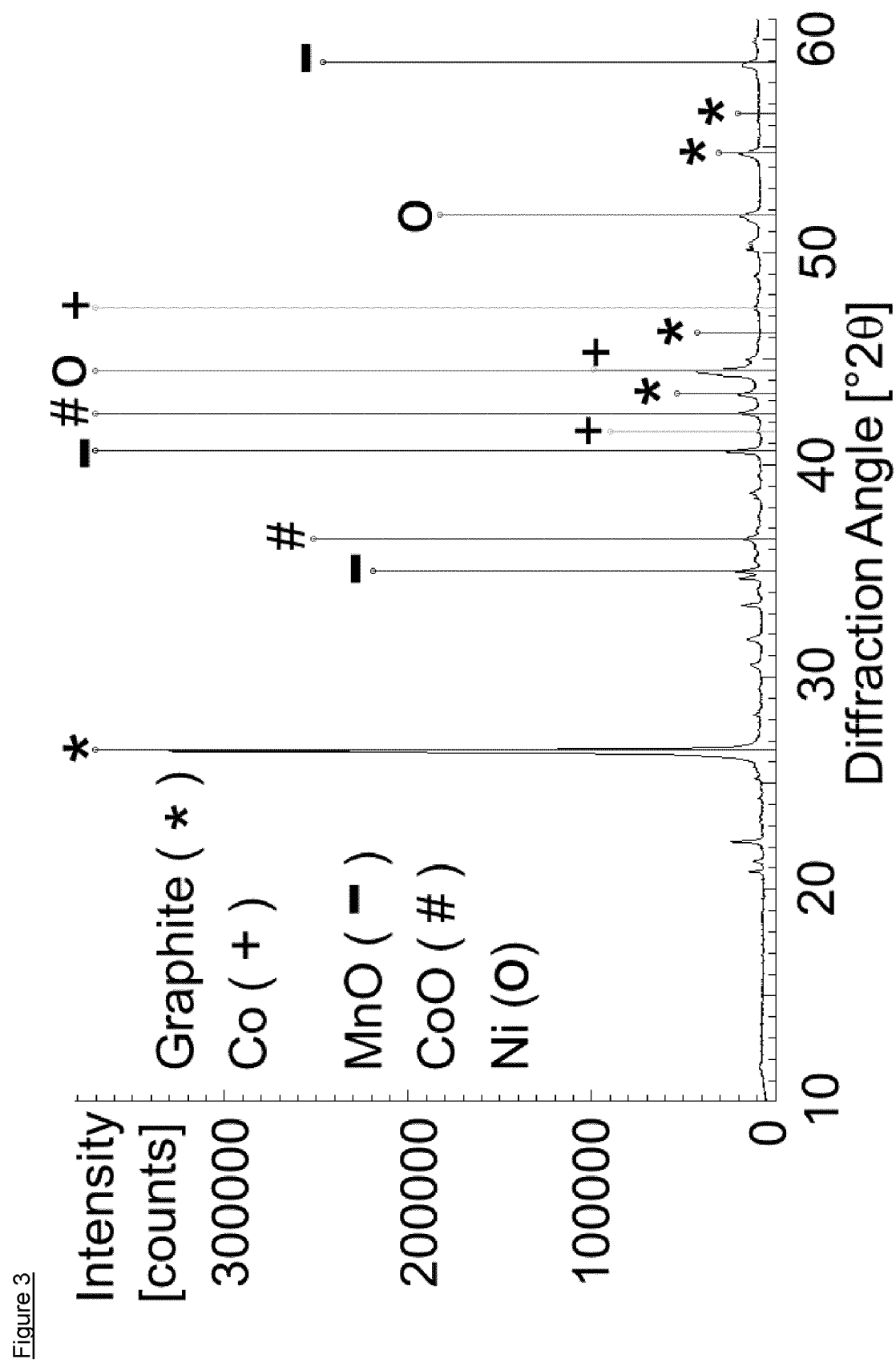
FIG. 3: X-ray powder diffractogram (Cu Kα) of reduced mass from waste lithium ion batteries after heat/reduction treatment as obtained in example 1a and used in example 2a including reference diffractograms of graphite, cobalt, manganese-II-oxide, cobalt oxide, and nickel.
Figure 4:
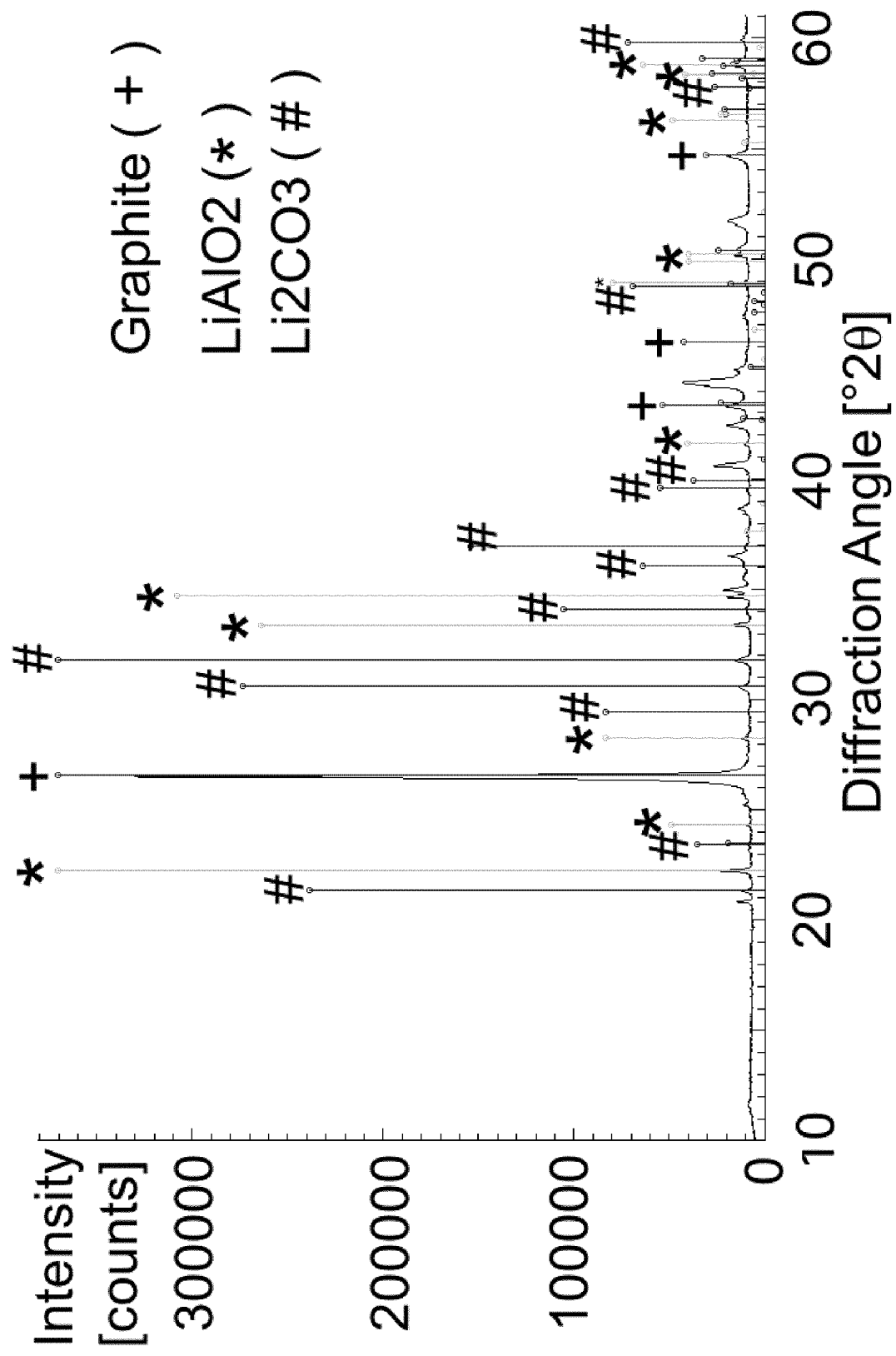
FIG. 4: X-ray powder diffractogram (Cu Kα) of reduced mass from waste lithium ion batteries after heat/reduction treatment as obtained in example 1a and used in example 2a including reference diffractograms of graphite, lithium aluminate, and lithium carbonate.
Figure 5:
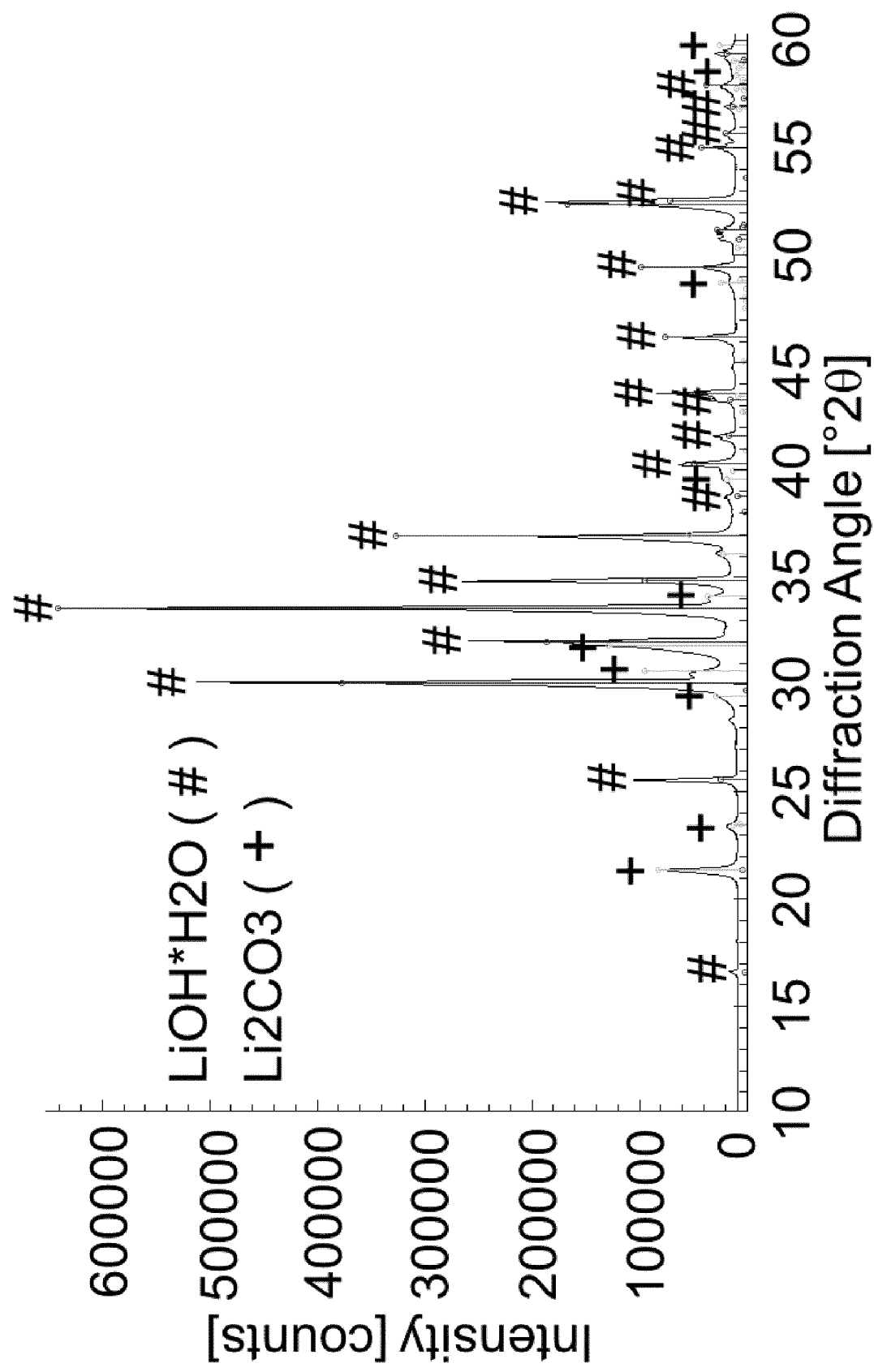
FIG. 5: X-ray powder diffractogram (Cu Kα) of LiOH monohydrate as obtained in example 5.

The invention claimed is:

1. A process for recovering lithium from a particulate material comprising waste lithium ion batteries or parts thereof, wherein the process comprises:
   (a) providing the particulate material comprising a transition metal compound and/or transition metal, wherein the transition metal is chosen from Mn, Ni, and Co, and wherein further at least a fraction of the Ni and/or Co, if present, are in an oxidation state lower than +2, and at least a fraction of the Mn, if present, is manganese (II)oxide; wherein the particulate material further comprises a lithium salt and a fluoride salt, and wherein the particulate material has a molar ratio of calcium to fluorine of 1.7 or less or zero,
   (b) treating the particulate material in step (a) with a polar solvent and an alkaline earth hydroxide;
   (c) separating solids from liquid of the particulate material in step (b), and optionally, washing the solid residue with a polar solvent, and
   further comprising recovering lithium from the solid residue and/or the liquid of the particulate material in step (b).

2. The process of claim 1, wherein the particulate material of step (a) is from waste lithium ion batteries and is in a form of a dry powder, wet powder, or suspension of particles in a liquid.

3. The process according to claim 1, wherein the particulate material of step (a) comprises particles having an average particle diameter D50 ranging from 1 μm to 2 mm, when detected in accordance with ISO 13320 EN: 2009-10.

4. The process according to claim 1, wherein the transition metal compound and/or transition metal Ni and/or Co in oxidation state lower than +2, comprised in the particulate material provided in step (a), comprises Ni and/or Co in the metallic state, and wherein the transition metal compound and/or transition metal comprised in the particulate material provided in step (a) is present in an amount detectable by powder x-ray diffractometry (Cu-k-alpha-1 radiation).

5. The process according to claim 1, wherein the lithium salt and the fluoride salt of the particulate material of step (a) comprises one of more salts of LiOH, LiF, Li2O, Li2CO3, LiHCO3, lithium aluminates, lithium phosphate salts, and mixed oxides of Li and one or more of Ni, Co, Mn, Fe, Al, Cu and/or fluorides of Ni, Co, Mn, Fe, Al, Cu.

6. The process according to claim 1, wherein treating in step (b) comprises:
   i) adding the alkaline earth hydroxide and/or an alkaline oxide, as a solid, or a mixture comprising the alkaline earth hydroxide as suspension or solution in protic solvent, and the particulate material of step (a) simultaneously to the polar solvent, which is a protic solvent;
   ii) adding the particulate material of step (a) to the polar solvent, which is a protic solvent, to obtain a suspension, followed by adding the alkaline earth hydroxide and/or an alkaline oxide, as a solid, or a mixture comprising alkaline earth hydroxide as suspension or solution in a protic solvent;
   iii) adding the alkaline earth hydroxide and/or an alkaline oxide, as a solid or suspension of solids in a polar solvent, to an aqueous liquid to obtain a mixture comprising alkaline earth hydroxide, and subsequently combining the mixture with the particulate material of step (a);
   iv) adding the alkaline earth hydroxide and/or an alkaline oxide, as a solid, to the particulate material of step (a) to obtain a mixture of solids, followed by adding the polar solvent;
   or
   v) adding the particulate material of step (a) to the polar solvent, which is a protic solvent, to obtain a suspension, followed by filtrating to obtain a filtrate, and subsequently adding the alkaline earth hydroxide and/or an alkaline oxide, as a solid, or a mixture comprising alkaline earth hydroxide to the filtrate.

7. The process according to claim 1, wherein the alkaline earth hydroxide added in step (b) is calcium hydroxide added, or calcium hydroxide is formed in situ upon contact of calcium oxide with the polar solvent, which is a protic solvent.

8. The process according to claim 1, wherein the particulate material of step (a) comprises material obtained from waste lithium ion batteries after carrying out a preliminary step (i) of heating under inert or reducing conditions to a temperature ranging from 80° C. to 900° C., wherein the preliminary step (i) is carried out after discharging the lithium ion batteries, dismantling, and/or shredding.

9. The process according to claim 8, wherein the preliminary step (i) is conducted under reducing conditions comprising carbon and/or a reducing gas chosen from hydrogen and carbon monoxide.

10. The process according to claim 8, wherein in the preliminary step (i) the temperature ranges from 350° C. to 500° C.

11. The process according to claim 1, wherein the particulate material of step (a) is obtained from lithium ion batteries after mechanic removal of casing, wiring or circuitry and discharging, and wherein the particulate material is not exposed to temperatures of 400° C. or more under oxidizing conditions before step (a).

12. The process according to claim 1, further comprising (d) subjecting the solids obtained in step (c) to a solid-solid separation.

13. The process according to claim 1, further comprising (f) recovering the transition metals nickel and/or cobalt by pyrometallurgical or hydro-metallurgical treatment of the solid residue obtained after carrying out step (c).

14. The process according to claim 12, further comprising (f) recovering the transition metals nickel and/or cobalt by pyrometallurgical or hydro-metallurgical treatment of the solid residue obtained after carrying out step (d).

15. The process according to claim 1, further comprising recovering lithium as lithium hydroxyde by crystallization from the liquid obtained in step (c), or recovering lithium as lithium carbonate after adding carbon dioxide to the liquid obtained in step (c) and isolating the lithium carbonate formed.

* * * * *